(12) United States Patent
Oh

(10) Patent No.: US 12,502,974 B2
(45) Date of Patent: *Dec. 23, 2025

(54) METHOD FOR CONTROLLING REGENERATIVE BRAKING OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 251 days.

This patent is subject to a terminal disclaimer.

(21) Appl. No.: 17/965,990

(22) Filed: Oct. 14, 2022

(65) Prior Publication Data
US 2023/0302914 A1    Sep. 28, 2023

(30) Foreign Application Priority Data
Mar. 23, 2022   (KR) .................. 10-2022-0035718

(51) Int. Cl.
*B60L 7/18*   (2006.01)

(52) U.S. Cl.
CPC ............. *B60L 7/18* (2013.01); *B60L 2240/10* (2013.01)

(58) Field of Classification Search
None
See application file for complete search history.

(56) References Cited

U.S. PATENT DOCUMENTS 6,033,041 A * 3/2000 Koga .................. B60L 7/18
                                                     303/192
6,314,342 B1 * 11/2001 Kramer ................ B60W 10/22
                                                     701/1

(Continued)

FOREIGN PATENT DOCUMENTS

JP   1999-0018207 A   1/1999
JP   2005-0269772 A   9/2005

(Continued)

OTHER PUBLICATIONS

D. Jeong, S. Kim, J. Lee, S. B. Choi, M. Kim and H. Lee, "Estimation of Tire Load and Vehicle Parameters Using Intelligent Tires Combined With Vehicle Dynamics," in IEEE Transactions on Instrumentation and Measurement, vol. 70, pp. 1-12, 2021, Art No. 9502712, doi: 10.1109/TIM.2020.3031124. (Year: 2020).*

*Primary Examiner* — Fadey S. Jabr
*Assistant Examiner* — Mario C Gonzalez
(74) *Attorney, Agent, or Firm* — Morgan Lewis & Bockius LLP

(57) ABSTRACT

A method for controlling regenerative braking includes determining a natural frequency of vehicle suspension pitch motion according to characteristics of a suspension device of vehicle; providing a filter of removing or passing a natural frequency component of the vehicle suspension pitch motion to a control unit; determining, by the control unit, a required regenerative braking force command based on vehicle driving information collected during driving; determining, by the control unit, a final front wheel regenerative braking force command and a final rear wheel regenerative braking force command through a filtering process using the filter from the determined required regenerative braking force command; and controlling, by the control unit, a regenerative braking force applied to a front wheel and a rear wheel by a driving device for driving the vehicle according to the determined final front wheel regenerative braking force command and final rear wheel regenerative braking force command.

16 Claims, 19 Drawing Sheets

(56) References Cited

U.S. PATENT DOCUMENTS

| | | | |
|---|---|---|---|
| 12,060,050 B2* | 8/2024 | Yamamoto | B60T 8/505 |
| 2012/0235612 A1* | 9/2012 | Akashi | H02P 6/10 |
| | | | 318/400.23 |
| 2013/0238164 A1* | 9/2013 | Matsuda | B60W 40/076 |
| | | | 701/1 |
| 2016/0304068 A1* | 10/2016 | Monzaki | B60T 8/171 |
| 2017/0066331 A1* | 3/2017 | Jeon | B60T 8/4081 |
| 2018/0099675 A1* | 4/2018 | Boisvert | B60W 10/02 |
| 2021/0171017 A1 | 6/2021 | Oh et al. | |
| 2021/0370896 A1* | 12/2021 | Momose | B60T 8/172 |

FOREIGN PATENT DOCUMENTS

| | | |
|---|---|---|
| JP | 2020-125057 A | 8/2020 |
| KR | 1994-0002050 B | 3/1994 |
| KR | 10-2203596 B | 1/2021 |
| WO | WO 2018-0214496 A | 11/2018 |

* cited by examiner

METHOD FOR CONTROLLING REGENERATIVE BRAKING OF VEHICLE

CROSS-REFERENCE TO RELATED APPLICATION

The present application claims priority to Korean Patent Application No. 10-2022-0035718 filed on Mar. 3, 2022, the entire contents of which is incorporated herein for all purposes by this reference.

BACKGROUND OF THE PRESENT DISCLOSURE

Field of the Present Disclosure

The present disclosure relates to a method for controlling a regenerative braking force of a vehicle. More particularly, it relates to a method for resolving problems of a phenomenon of repeated occurrence of wheel slip caused by longitudinal load movement and deterioration of wheel slip control performance by reflecting pitch motion characteristics and longitudinal load movement information of a vehicle in real time in advance to control a regenerative braking force of the vehicle.

Description of Related Art

Despite the recent introduction of various electronic control devices to a vehicle, motion of the vehicle is ultimately limited due to the limit of frictional force on a road surface. A reason therefor is that motion of the vehicle is obtained through frictional force with respect to the road surface through a tire. Therefore, how effectively the frictional force may be used is an important factor in determining the motion of the vehicle.

To effectively use the frictional force, it is important to control the frictional force which may be provided by the road surface so that a driving force and a regenerative braking force of the wheel do not exceed the frictional force. Here, the frictional force which may be provided by the road surface is complexly affected by road surface characteristics, longitudinal/lateral tire slip amount, tire vertical load, etc. Among these factors, the tire vertical load is a factor that most directly affects the frictional force on the road surface.

In general, as a method of using frictional force, it is known to use an electronic control device such as an anti-lock braking system (ABS) and a traction control system (TCS) to limit tire slip. However, control methods of the ABS and the TCS have disadvantages in that those methods do not effectively exhibit slip control performance due to a problem of wheel speed signal processing, etc. for prevention of control cycle delay or malfunction.

According to the recent trend of wheel slip control strategies in electrified vehicles, many methods have been proposed to use the torque and speed of a motor based on fast motion of the motor rather than using a vehicle body reference speed and a wheel speed.

This strategy has an advantage in that an absolute speed or a reference speed of the vehicle is not required, and thus may be effective in an e-4WD (4WD: Four Wheel Drive) system. However, unless a control operation is performed to reflect information related to suspension pitch motion and the tire vertical load changed by the suspension pitch motion in advance, a situation requiring driving force reduction control may be repeatedly encountered due to limitations of feedback control.

For example, when a driving force of a front wheel is generated, a vehicle pitch angle increases, and then a vertical load of the front wheel decreases, causing tire slip at the front wheel. At the instant time, when the TCS is operated to reduce the driving force of front wheel, the tire slip amount of the front wheel is reduced and the pitch angle of the vehicle is reduced, so that the vertical load of the front wheel may be ensured again. However, when the driving force of the front wheel is subsequently increased, the vertical load of the front wheel decreases again while the pitch angle of the vehicle increases again, and thus tire slip of the front wheel may occur again.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method configured for resolving problems of a phenomenon of repeated occurrence of wheel slip caused by longitudinal load movement and deterioration of wheel slip control performance by reflecting pitch motion characteristics and longitudinal load movement information of a vehicle in real time in advance to control a regenerative braking force of the vehicle.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method for controlling regenerative braking of a vehicle including determining a natural frequency of vehicle suspension pitch motion according to characteristics of a suspension device of the vehicle, providing a filter configured for removing or passing a natural frequency component of the vehicle suspension pitch motion to a control unit of the vehicle, determining, by the control unit, a required regenerative braking force command based on vehicle driving information collected during vehicle driving, determining, by the control unit, a final front wheel regenerative braking force command and a final rear wheel regenerative braking force command through a filtering process using the filter from the determined required regenerative braking force command, and controlling, by the control unit, a regenerative braking force applied to a front wheel and a rear wheel of the vehicle by a driving device for driving the vehicle according to the determined final front wheel regenerative braking force command and the determined final rear wheel regenerative braking force command.

Other aspects and exemplary embodiments of the present disclosure are discussed infra.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
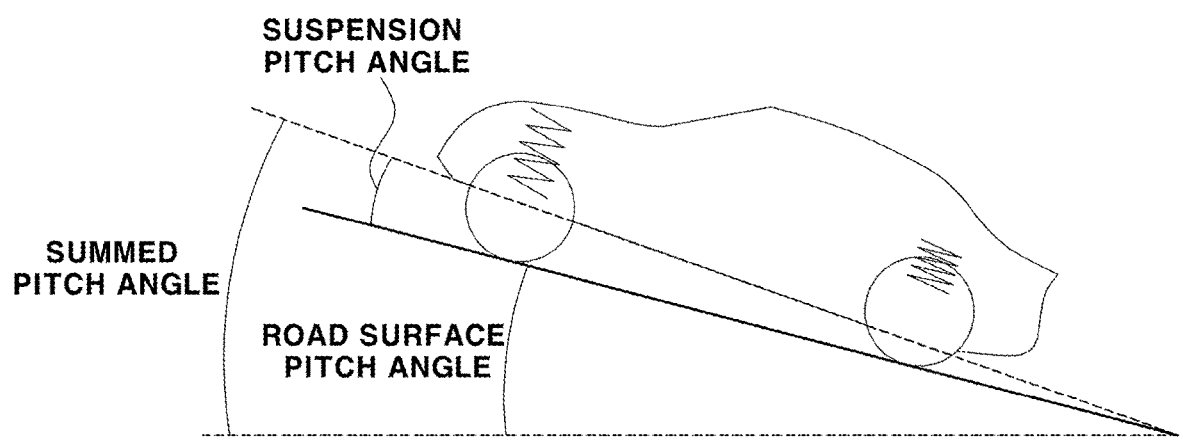
FIG. 1 is a diagram for describing a pitch angle in a vehicle.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Meanwhile, in an exemplary embodiment of the present disclosure, even though terms such as "first", "second", etc. may be used to describe various elements, the elements are not limited by these terms. These terms are only used to distinguish one element from another. For example, within the scope not departing from the scope of the rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to", should be interpreted similarly.

Like reference numerals refer to like elements throughout. The terminology used herein is for the purpose of describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Various embodiments of the present disclosure relates to a method for controlling regenerative braking of a vehicle, and provides a method configured for resolving problems of a phenomenon of repeated occurrence of wheel slip caused by longitudinal load movement and deterioration of wheel slip control performance by reflecting pitch motion characteristics and longitudinal load movement information of a vehicle in real time in advance to control a regenerative braking force of the vehicle.

In an exemplary embodiment of the present disclosure, to control a regenerative braking force applied to a driving wheel by a driving device (that is, a motor) of the vehicle, information related to a transfer function TF, which takes a variable representing a driving state of the vehicle as input, and determines and outputs state information related to pitch motion of the vehicle, is used. Here, the driving wheel includes both a front wheel and a rear wheel of the vehicle. Furthermore, in an exemplary embodiment of the present disclosure, the vehicle is a vehicle in which regenerative braking force may be applied to both the front wheel and the rear wheel.

In an exemplary embodiment of the present disclosure, the regenerative braking force is a force applied to the driving wheel by the motor, which is the driving device configured for driving the vehicle, and may be the sum of forces acting between a road surface and a tire of the driving wheel, which is connected to the motor to be able to transmit power.

The regenerative braking force may be a force by torque applied to the driving wheel by the motor, which is the driving device of the vehicle. In the present instance, the torque applied to the driving wheel becomes regenerative braking torque applied by the motor. Furthermore, the regenerative braking force is a force that decelerates the vehicle and not a force that accelerates the vehicle (driving force), and refers to a braking force by the regenerative braking torque applied to the driving wheel by the motor to decelerate the vehicle.

Furthermore, in an exemplary embodiment of the present disclosure, control of the regenerative braking force may be performed by controlling the operation and output of the motor, which is the driving device, or by controlling the torque applied to the driving wheel. In the following description, "regenerative braking force" and "regenerative braking force command" may be replaced with "regenerative braking torque" and "regenerative braking torque command".

A basic concept of a regenerative braking control method according to an exemplary embodiment of the present disclosure is to use state and characteristic information related to pitch motion of the vehicle. The existing regenerative braking control method for suppressing wheel slip is a feedback control method that corrects the regenerative braking force after wheel slip has already occurred. However, in an exemplary embodiment of the present disclosure, before wheel slip occurs, the magnitude of the regenerative braking force is adjusted to correspond to the pitch motion by use of the state and characteristic information related to the pitch motion of the vehicle.

As the state and characteristic information related to the pitch motion of the vehicle, mention may be made of the tire vertical load and the pitch angle of the vehicle, of the vehicle load and the pitch angle, the tire vertical load is the most direct factor for determining a limit of traction between the road surface and the tire. As the tire vertical load increases, the available traction increases, making it difficult to cause wheel slip. As the tire vertical load decreases, the available traction decreases, making it vulnerable to wheel slip.

There are many reasons for the change in the tire vertical load, and it is difficult to control the driving force and the regenerative braking force while considering all the reasons including the change due to disturbance. Therefore, at least the change in the tire vertical load caused by the regenerative braking force itself, except for the change due to disturbance, is worth considering in a regenerative braking control process.

Furthermore, when a regenerative braking force is generated in the vehicle, the pitch moment is generated due to a difference between the center of gravity and a pitch center of the vehicle, and the pitch motion of the vehicle is excited. At the instant time, a pitch angle is generated by mechanical characteristics of a suspension device and a vehicle body.

In general, a pitch angle increases when a vehicle accelerates, and a state of the vehicle at the instant time is referred to as nose-up motion or a squat state. Furthermore, when the vehicle decelerates, the pitch angle decreases, which is referred to as nose-down motion or a dive state.

When such pitch motion of the vehicle occurs, the suspension device of the vehicle is contracted or stretched. As a result, a spring or a damper of the suspension device is displaced, and the tire vertical load is affected.

In an exemplary embodiment of the present disclosure, only a suspension pitch angle and not a road surface pitch angle, is considered as the pitch motion, and definition of the suspension pitch angle is illustrated in FIG. 1. FIG. 1 is a diagram for describing a pitch angle in the vehicle.

As illustrated in the figure, the pitch angle in the vehicle may be divided into a suspension pitch angle and a road surface pitch angle, and the sum of the suspension pitch angle (absolute value) and the road surface pitch angle (absolute value) may be defined as a summed pitch angle.

When a stroke difference occurs between a front wheel suspension device and a rear wheel suspension device, so that the front wheel suspension device is more rebounded (stretched) than the rear wheel suspension device, and the rear wheel suspension device is more bumped (contracted) than the front wheel suspension device, the suspension pitch angle may be defined as a position (+) suspension pitch angle. At the instant time, a suspension pitch angle of a vehicle state illustrated in FIG. 1 is a positive value.

The road surface pitch angle corresponds to a longitudinal inclination of the vehicle due to an inclination of the road surface, and the suspension pitch angle represents a longitudinal (pitch direction) inclination of the vehicle caused by extending or contraction of the front and rear wheel suspension devices. In a typical vehicle, the road surface pitch angle (road gradient) may be detected through a longitudinal acceleration sensor.

Information related to the suspension pitch angle (suspension pitch angle information) illustrated in FIG. 1 in the vehicle is information indicating a pitch direction vibration state of the vehicle according to a stroke change of the front suspension device and the rear suspension device during vehicle driving, which may be obtained through a sensor of the suspension device, or may be estimated based on information collected through a sensor in the vehicle.

A method of obtaining suspension pitch angle information through a sensor of a suspension device in a vehicle is known technology. For example, by use of a position sensor of the front wheel suspension device and a position sensor of the rear wheel suspension device to compare positions of the front wheel and the rear wheel based on signals of the position sensors, it is possible to determine suspension pitch angle information of the vehicle.

Furthermore, a method of estimating suspension pitch angle information is known technology. That is, there is a known method of obtaining a pitch angle by integrating a signal of a pitch rate sensor or kinematically estimating the pitch angle based on a longitudinal or vertical direction acceleration sensor value.

Furthermore, there are a method of estimating the pitch angle through a suspension device model-based observer, a method of determining the pitch angle through a wheel speed information and driving force (regenerative braking force) information model, a method of observing pitch angle information using a sensor fusion method by integrating these methods, etc.

The vehicle state illustrated in FIG. 1 may be referred to as a state in which the suspension pitch angle indicates a positive (+) value direction. In the present instance, the vehicle state may be referred to as a squat state based on the suspension pitch angle. Contrary to FIG. 1, when the suspension pitch angle indicates a negative (−) value direction, the vehicle state may be referred to as a dive state based on the suspension pitch angle.

Furthermore, the vehicle state illustrated in FIG. 1 is a state in which the vehicle body is tilted backward, and thus may be referred to as a squat state based on the vehicle body. The squat state (body squat state) with respect to the vehicle body may be referred to as a state in which the vehicle body is tilted backward based on a non-tilted horizontal line (inclination angle=0°).

Furthermore, a state in which the vehicle body is tilted forward may be referred to as a dive state with respect to the vehicle body, and the vehicle body dive state may be referred to as a state in which the vehicle body is tilted forward with respect to the horizontal line.

As described above, in the vehicle state illustrated in FIG. 1, the squat state may be induced based on the suspension pitch angle when the vehicle is accelerated, and the vehicle dive state may be induced based on the suspension pitch angle when the vehicle is decelerated.

At the present time, the change in the vehicle suspension pitch motion or the longitudinal load movement of the vehicle due to the change in the state of the suspension device appears according to characteristics (suspension device characteristics of the vehicle) determined by vehicle-specific suspension device setting. Here, the setting includes all of the spring stiffness, damping force, bushing stiffness, suspension arm flow geometry, etc. of the suspension device.

Due to these characteristics, suspension pitch motion such as dive (nose down)/squat (nose up) of the vehicle is generated while exhibiting the characteristics determined by the above setting. Here, the characteristics mean motion with a specific natural frequency.

Accordingly, a principle of the present disclosure is modeling the vehicle suspension pitch motion or longitudinal load movement determined by the setting and characteristics of the suspension device of the vehicle, removing a frequency component corresponding to a natural frequency of the present model from a regenerative braking force command using a filter, generating a regenerative braking force command that does not excite the suspension pitch motion or longitudinal load movement of the vehicle as much as possible, and controlling the regenerative braking force by the motor of the vehicle using the present regenerative braking force command, preventing wheel slip.

Alternatively, on the other hand, by further enhancing the frequency component corresponding to the natural frequency using a filter in a regenerative braking force command, an appropriate regenerative braking force is applied to a driving axle of one of the front wheel and the rear wheel having a traction ensured by load movement, ensuring braking performance within a range within which wheel slip may be suppressed.

Figure 2:
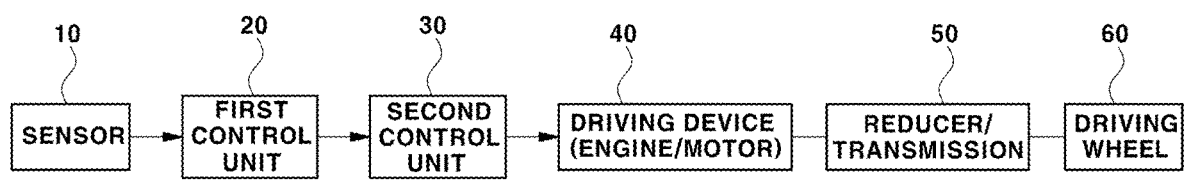
FIG. 2 is a block diagram illustrating a configuration of an apparatus of performing a regenerative braking control process according to various exemplary embodiments of the present disclosure.
Figure 3:
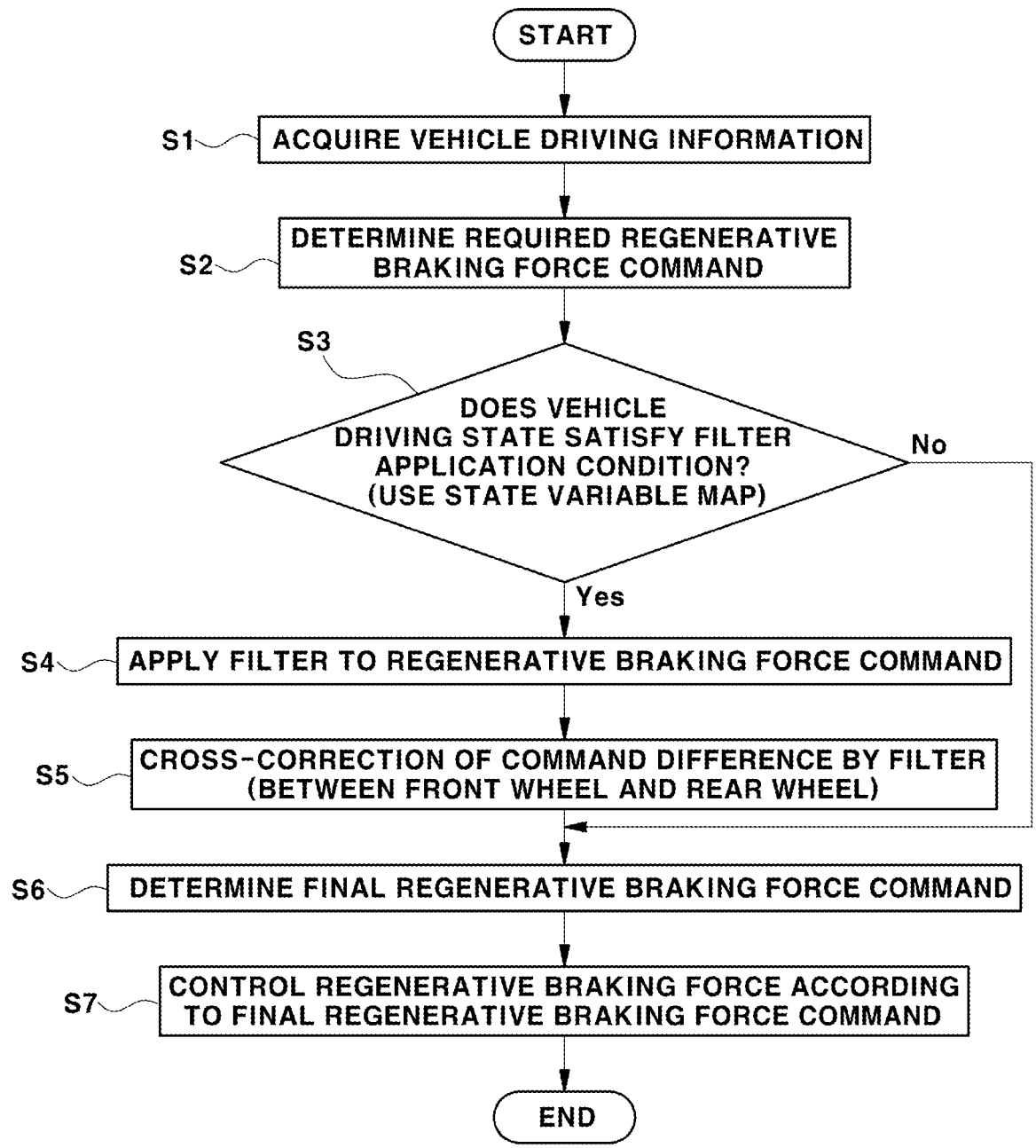
FIG. 3 is a flowchart illustrating a regenerative braking control process of the vehicle according to an exemplary embodiment of the present disclosure.

Next, an apparatus of controlling regenerative braking will be described together with a detailed description of the regenerative braking control method. FIG. 2 is a block diagram illustrating a configuration of an apparatus of performing a regenerative braking control process according to various exemplary embodiments of the present disclosure, and FIG. 3 is a flowchart illustrating a regenerative braking control process of the vehicle according to an exemplary embodiment of the present disclosure.

Referring to FIG. 2, an apparatus of controlling regenerative braking according to an exemplary embodiment of the present disclosure includes a first control unit 20 that determines a required regenerative braking force command (required torque command) from vehicle driving information, and determines and outputs a front wheel regenerative braking force command and a rear wheel regenerative braking force command distributed according to a front and rear wheel power distribution ratio from the required regenerative braking force command, a second control unit 30 that is configured to control a regenerative braking force applied to the front and rear wheels of the vehicle according to the front wheel regenerative braking force command and the rear wheel regenerative braking force command received from the first control unit 20, and a front wheel driving device and a rear wheel driving device as a driving device 40 for driving the vehicle, an operation (generation and application of the regenerative braking force) thereof is controlled by the second control unit 30.

Here, the front wheel regenerative braking force command is a command generated and output by the first control unit 20 to apply a regenerative braking force (regenerative braking torque) to the front wheel and a front axle among the driving wheels and driving axles of the vehicle, and the rear wheel regenerative braking force command is a command generated and output by the first control unit 20 to apply a regenerative braking force to the rear wheel and a rear axle. The front wheel regenerative braking force command and the rear wheel regenerative braking force command may be torque commands, and at the instant time, a value of each regenerative braking force command becomes a value of the regenerative braking torque distributed to a corresponding driving wheel and a driving axle.

Furthermore, the front wheel regenerative braking force command and the rear wheel regenerative braking force command may be a torque command for the front wheel driving device and a torque command for the rear wheel driving device, respectively. Because the driving device of the vehicle is a motor, both the front wheel torque command and the rear wheel torque command become motor torque commands.

In the following description, "front wheel regenerative braking force command" may be replaced with "front wheel regenerative braking torque command", "front axle regenerative braking torque command", or "front axle regenerative braking force command". Furthermore, "rear wheel regenerative braking force command" may be replaced with "rear wheel regenerative braking torque command", "rear axle regenerative braking torque command", or "rear axle regenerative braking force command".

The regenerative braking force control method according to an exemplary embodiment of the present disclosure may be applied to a 4WD vehicle in which the front wheel and rear wheel are driven by independent driving devices, respectively, and specifically, may be applied to a vehicle to which an e-4WD system including motors as both the front wheel driving device and the rear wheel driving device is applied, that is, an e-4WD vehicle.

In the example of the e-4WD vehicle, the first control unit 20 determines a required regenerative braking force command for driving the vehicle from vehicle driving information, and distributes the required regenerative braking force command to the front wheel regenerative braking force command and the rear wheel regenerative braking force command according to a determined front and rear wheel power distribution ratio.

The required regenerative braking force command may be a required torque command determined and generated based on vehicle driving information collected in real time while driving in a normal vehicle. In the present instance, the first control unit 20 may be a control unit that determines and generates a required torque command based on vehicle driving information in a normal vehicle, that is, a vehicle control unit (VCU).

A method of determining and generating a required torque command in a normal vehicle and a process thereof are well-known in the art, and thus a detailed description thereof will be omitted.

Furthermore, a filter applied to the regenerative braking force command is configured in the first control unit 20, and the first control unit 20 applies the filter to the regenerative braking force command to correct the regenerative braking force command, and generates and outputs a final regenerative braking force command (final front wheel regenerative braking force command and final rear wheel regenerative braking force command) undergoing a correction process by the filter.

The first control unit 20 performs correction for selectively applying a filter to the required regenerative braking force command before distribution, the distributed front wheel regenerative braking force command, or the distributed rear wheel regenerative braking force command, as will be described later. In the present instance, the first control unit 20 may additionally correct the regenerative braking force command to which the filter is not applied, considering that correction using the filter is performed.

Furthermore, the first control unit 20 determines the final front wheel regenerative braking force command and rear wheel regenerative braking force command through the above correction process including application of the filter to the regenerative braking force command, and outputs the determined final front wheel regenerative braking force command and rear wheel regenerative braking force command to the second control unit 30.

As described above, the final front wheel regenerative braking force command and the final rear wheel regenerative braking force command determined and output by the first control unit 20 are final regenerative braking force commands undergoing a correction process by a filter to be described later. The correction process by the filter means a predetermined filtering process using the filter. The use of the filter and the filtering process will be described in detail later.

Furthermore, when the final front wheel regenerative braking force command (final front wheel torque command) and the final rear wheel regenerative braking force command (final rear wheel torque command) are determined by the first control unit 20 and output, the second control unit 30 is configured to control the regenerative braking force (regenerative braking torque) applied to the front wheel and rear wheel according to the final front wheel regenerative braking force command and the final rear wheel regenerative braking force command output from the first control unit 20.

In the present instance, the second control unit 30 may control the operations of the front wheel driving device (front wheel motor) and the rear wheel driving device (rear wheel motor), each of which is the driving device 40 of the vehicle, according to the final regenerative braking force command output from the first control unit 20. As a result, the regenerative braking force (regenerative braking torque) by each controlled driving device 40 is transmitted to the front wheel and rear wheel, each of which is a driving wheel 60, through a reducer (or transmission) 50, so that the vehicle may be decelerated.

The second control unit 30 may be a motor control unit (MCU) that is configured to control the regenerative operation of the motor, which is the driving device 40, through an inverter according to a regenerative braking force command (regenerative braking torque command) in a normal motor-driven vehicle.

In the above description, a control subject includes the first control unit and the second control unit. However, a regenerative braking control process according to an exemplary embodiment of the present disclosure may be performed by one integrated control element instead of a plurality of control units.

The plurality of control units and the one integrated control element may all be collectively referred to as a control unit, and the regenerative braking control process of the present disclosure described below may be performed by the present control unit. That is, the control unit may collectively refer to both the first control unit and the second control unit.

The required regenerative braking force command (required regenerative braking torque command) determined by the first control unit 20 is determined and generated based on vehicle driving information collected in real time while driving in the vehicle, and the vehicle driving information may be sensor detection information detected by a sensor 10 and input to the first control unit 20 through a vehicle network.

The sensor 10 detecting the vehicle driving information may include a brake pedal sensor (BPS) detecting a brake pedal input value of the driver, a sensor configured for detecting a drive system speed, and a sensor configured for detecting a vehicle speed.

The drive system speed may be a rotation speed of the driving device 40 (driving device speed), a rotation speed of the driving wheels 60 (wheel speed or driving wheel speed), or a rotation speed of a driveshaft (driveshaft speed).

Here, the rotation speed of the driving device may be a rotation speed of the motor (motor speed). In the present instance, the sensor configured for detecting the drive system speed may be a sensor configured for detecting a speed of the motor, which may be a resolver for detecting a position of a rotor of the motor. Alternatively, the sensor configured for detecting the drive system speed may be a wheel speed sensor configured for detecting a rotation speed (wheel speed) of the driving wheel or a sensor configured for detecting a rotation speed of the driveshaft.

Furthermore, the sensor configured for detecting the vehicle speed may also be a wheel speed sensor. Obtaining vehicle speed information from a signal of the wheel speed sensor is a well-known technology in the art, and thus a detailed description thereof will be omitted.

As the vehicle driving information detected by the sensor 10 and for determining the required regenerative braking force command by the first control unit 20, it is possible to selectively use a brake pedal input value (BPS value) of the driver, a speed (rotation speed) of the driving device, a vehicle speed, etc. In the vehicle driving information, the brake pedal input value may be referred to as driver driving input information, and the speed and vehicle speed of the driving device 40 may be referred to as vehicle state information.

Alternatively, the vehicle driving information may be information determined by the first control unit 20 itself or may be information (for example, required regenerative braking force information or required torque information) input to the first control unit 20 through the vehicle network from another control unit (for example, ADAS control unit) in the vehicle.

Furthermore, in the exemplary embodiment of the present disclosure, the sensor 10 may further include a sensor of the suspension device for acquiring suspension pitch angle information. Here, the sensor of the suspension device for acquiring the suspension pitch angle information may include the position sensor of the front wheel suspension device and the position sensor of the rear wheel suspension device.

As described above, a method for obtaining suspension pitch angle information through a sensor of a suspension device is known technology. For example, suspension pitch angle information of the vehicle may be determined by comparing the positions of the front wheel and the rear wheel based on a signal from the position sensor.

Furthermore, as described above, the suspension pitch angle, etc. may be obtained by an estimation process determined based on information collected from the vehicle through a sensor, etc. Because an estimation method thereof is a well-known technical item at the level of those skilled in the art, a detailed description thereof will be omitted.

Meanwhile, while the vehicle is accelerating, suspension pitch motion of the vehicle occurs in a nose-up (squat) direction, and at the instant time, the load is transferred to the rear of the vehicle. Therefore, when compared to a neutral state of the load (stationary state), the vertical load of the front axle decreases, making it easy to cause wheel slip, and the vertical load of the rear axle increases, making it difficult to generate wheel slip.

Therefore, at the instant time, in the case of the front wheel and the front axle, it is preferable to remove the natural frequency component of the vehicle suspension pitch motion from the driving force command to prevent wheel slip. Furthermore, in the case of the rear wheel and wheel axle, even when the natural frequency component of the vehicle suspension pitch motion is enhanced in the driving force command, wheel slip rarely occurs. Thus, it is desirable to control the braking performance by enhancing the natural frequency component with respect to the driving force command.

This is reversed while the vehicle is decelerating (regenerative braking). While the vehicle is decelerating, pitch motion occurs in a nose-down (dive) direction and the load is shifted forward thereof. Therefore, when compared to a neutral load state (stationary state), the vertical load on the front axle increases, making it difficult to cause slip, and the vertical load on the rear axle decreases, making it easy to generate slip.

Therefore, in the present instance, in the rear wheel and the rear axle, it is desirable to perform a control operation to prevent wheel lock by removing a natural frequency component of the pitch motion from the regenerative braking force command. In the front wheel and the front axle, wheel lock hardly occurs even when the natural frequency component of the pitch motion is enhanced in the regenerative braking force command, and thus it is desirable to perform a control operation to enhance the braking performance and increase the amount of regeneration by enhancing the natural frequency component.

In consideration of the present point, in an exemplary embodiment of the present disclosure, a filter that removes the natural frequency component of the vehicle suspension pitch motion (natural frequency removal filter) or a filter that enhances the natural frequency component (natural frequency enhancement filter) is applied to the regenerative braking force command for each of the front axle and the rear axle, so that control may be implemented, preventing wheel slip and maximizing braking performance.

At the present time, to set drivability and driving performance, it is possible to perform a control operation of selectively applying filters to both axles, or compensating for a torque difference between the front and rear wheels caused by an effect of applying a filter on one axle to the other axle.

To remove or enhance the frequency component that excites the suspension pitch motion of the vehicle in the regenerative braking force command using the filter, first, the frequency characteristic of the suspension pitch motion for the vehicle to be controlled needs to be identified. This process may be performed by constructing various types of transfer functions.

In an exemplary embodiment of the present disclosure, for regenerative braking control, information of a transfer function is used, in which a variable representing a vehicle driving state is taken as input and state information related to suspension pitch motion of the vehicle is taken as output. Here, the information of the transfer function may be a natural frequency, and the state information related to the suspension pitch motion, which is output of the transfer function, may be suspension pitch angle information or tire vertical load information.

Here, the tire vertical load information may include a front wheel vertical load and a rear wheel vertical load. In the following description, "front wheel vertical load" may be replaced with "front axle vertical load", and "rear wheel vertical load" may be replaced with "rear axle vertical load".

In an exemplary embodiment of the present disclosure, the suspension pitch angle (hereinafter abbreviated as "pitch angle") or the tire vertical load (hereinafter abbreviated as "vertical load") may be determined using a transfer function, and an example of determining the pitch angle or vertical load using the transfer function will be described as follows.

In an exemplary embodiment of the present disclosure, the transfer function is modeled and constructed to be able to determine state information related to the suspension pitch motion of the vehicle by inputting a variable representing the vehicle driving state. Here, the state information related to the suspension pitch motion of the vehicle may be a pitch angle or a vertical load.

Figure 4:
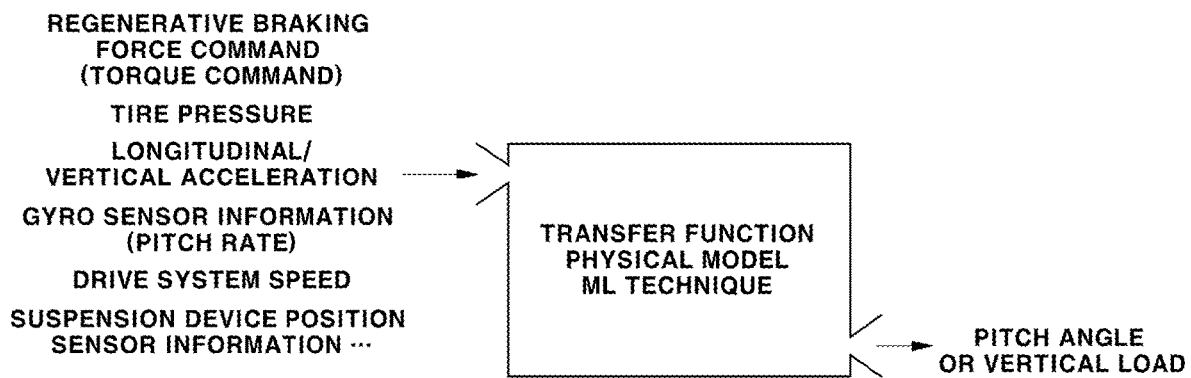
FIG. 4 is a diagram illustrating that a pitch angle or a vertical load may be determined using a transfer function in an exemplary embodiment of the present disclosure.

FIG. 4 is a diagram illustrating that a pitch angle or a vertical load may be determined using a transfer function, which takes a variable representing a vehicle driving state as input thereof, in an exemplary embodiment of the present disclosure. In various exemplary embodiments of the present disclosure, the transfer function may take the following form.

First, a transfer function taking regenerative braking force information as input and taking pitch angle information as output, or a transfer function taking pitch angle information as input and taking vertical load information as output may be constructed in the control unit (first control unit 20) and used. Here, the regenerative braking force information may be a required regenerative braking force command (required regenerative braking torque command) determined by the control unit.

The required regenerative braking force command and the pitch angle, which are input to the transfer function, are variable information indicating the vehicle driving state, and may be obtained from information detected by the sensor 10. It has been described above that the required regenerative braking force command is determined from the sensor detection information, and that the pitch angle may be obtained from information detected by a suspension device position sensor.

Alternatively, a transfer function taking regenerative braking force information as input and taking vertical load information as output, or a transfer function taking tire pressure information detected by a tire pressure sensor as input and taking vertical load information as output may be constructed in the control unit and used.

Alternatively, a transfer function taking longitudinal or vertical acceleration information of the vehicle detected by a longitudinal acceleration sensor or a vertical acceleration sensor provided in the vehicle as input and taking pitch angle or vertical load information as output may be constructed in the control unit and used.

Alternatively, a transfer function taking pitch angle change rate (pitch rate) information obtained by a gyro sensor (pitch rate sensor) as input and taking pitch angle or vertical load information as output may be constructed in the control unit and used.

Alternatively, a transfer function taking a drive system speed as input and taking pitch angle or vertical load information as output may be constructed in the control unit and used. Here, the drive system speed may be a wheel speed, or a driving device speed (motor speed), or driveshaft speed.

Alternatively, a transfer function taking information detected by a suspension travel sensor as input and taking pitch angle or vertical load information as output may be constructed in the control unit and used.

Alternatively, a transfer function taking two pieces or more of the above-mentioned input information as input and taking pitch angle or vertical load information as output may be constructed in the control unit and used.

Here, the transfer function may be set to determine the pitch angle or vertical load using a data-based optimization technique or a numerical solution.

Alternatively, a transfer function based on a physical model may be constructed and used, or a learning technique may be used to obtain the transfer function. Furthermore, an algorithm including the above input and output may be constructed using various machine learning techniques in addition to the transfer function.

Meanwhile, a state in which the transfer function is constructed in the control unit, that is, in a state in which a transfer function capable of outputting pitch angle or vertical load information, which is state information related to the suspension pitch motion of the vehicle, by taking a variable representing the vehicle driving state as input is constructed, a natural frequency of the transfer function may be determined. In the present instance, the transfer function may represent the unique characteristics of the vehicle to which the regenerative braking control method of the present disclosure is applied.

In an exemplary embodiment of the present disclosure, as described above, the natural frequency of the transfer function constructed to output the state information related to the suspension pitch motion of the vehicle by taking the variable representing the vehicle driving state as input may be regarded as a natural frequency of suspension pitch motion vibration in a vehicle to be controlled. In the following description, "the natural frequency of the transfer function" and "the natural frequency of the vehicle suspension pitch motion" may have the same meaning.

Furthermore, in a state in which the natural frequency of the vehicle suspension pitch motion, that is, the natural frequency of the pre-constructed transfer function is determined as described above, a filter to be applied to the regenerative braking force command is configured and set in the control unit based on natural frequency information of the determined transfer function to control regenerative braking of the vehicle.

In the instant case, a filter capable of removing a frequency component corresponding to the natural frequency of the transfer function from the regenerative braking force command may be configured and set in the control unit. In various exemplary embodiments of the present disclosure, the filter may be a filter configured and set using a Laplace transfer function.

As described above, in a state in which the transfer function is constructed in the control unit of the vehicle to which an exemplary embodiment of the present disclosure is actually applied, suspension pitch motion information of the vehicle (state information related to the suspension pitch motion of the vehicle), such as a pitch angle or vertical load, which is the output of the transfer function, may be used in various ways for vehicle control. Furthermore, the natural frequency of the transfer function constructed in the control unit of the vehicle may be used to design and configure the filter in the control unit as in an exemplary embodiment of the present disclosure.

Furthermore, as described above, the natural frequency is not determined in a state in which the transfer function is constructed in the control unit of the actual vehicle to which an exemplary embodiment of the present disclosure is applied, and the natural frequency of the transfer function may be obtained after the transfer function described above is constructed through a preceding evaluation and test process conducted in a development stage of the same type of vehicle. Furthermore, a filter designed using the natural frequency information obtained in the instant way may be configured and set in a control unit of an actual mass-produced vehicle and used for regenerative braking control.

Hereinafter, an example of filter application will be described in more detail.

In the following description, "regenerative braking force command" may refer to one of a required regenerative braking force command determined based on vehicle driving information in the first control unit 20, a front wheel regenerative braking force command, which is a command generated to apply a regenerative braking force distributed to the front wheel based on the required regenerative braking force command, and a rear wheel regenerative braking force command, which is a command generated to apply a regenerative braking force distributed to the rear wheel based on the required regenerative braking force command. That is, the "regenerative braking force command" may be understood to encompass all of the required regenerative braking force command, the front wheel regenerative braking force command, and the rear wheel regenerative braking force command.

In the following description, "front wheel regenerative braking force command" may be a torque command for the front wheel and the front axle, which may be a regenerative braking torque command of the front wheel driving device (for example, a regenerative braking torque command of a front wheel motor). That is, "front wheel regenerative braking force command" may be a command of a torque value applied to the front wheel and the front axle by the front wheel driving device.

Furthermore, in the following description, "rear wheel regenerative braking force command" may be a torque command for the rear wheel and the rear axle, which may be a regenerative braking torque command of the rear wheel driving device (a regenerative braking torque command of a rear wheel motor). That is, "rear wheel regenerative braking force command" may be a command of a regenerative braking torque value applied to the rear wheel and the rear axle by the rear wheel driving device.

FIG. 5A, FIG. 5B, FIG. 5C, FIG. 5D, FIG. 5E, FIG. 5F, FIG. 5G, and FIG. 5H are diagrams for describing various examples in which a final front wheel regenerative braking force command and a final rear wheel regenerative braking force command are obtained using a filter configured for removing the natural frequency component of the transfer function in an exemplary embodiment of the present disclosure, and illustrate examples of using the filter configured for removing the natural frequency component of the transfer function, that is, a filter configured for removing the natural frequency component of the vehicle suspension pitch motion from the regenerative braking force command.

In FIG. 5A, FIG. 5B, FIG. 5C, FIG. 5D, FIG. 5E, FIG. 5F, FIG. 5G, and FIG. 5H, a vertical axis represents regenerative braking force and a horizontal axis represents time. Furthermore, unlike the driving force which may be expressed as a positive (+) value, the regenerative braking force may be expressed as a negative (−) value, as may be seen from the drawings.

Furthermore, the driving torque is torque in a forward direction for accelerating the vehicle, and is generally expressed as positive (+) torque among those skilled in the art. Furthermore, the regenerative braking torque is torque in a reverse direction for decelerating the vehicle, and is generally expressed as negative (−) torque among those skilled in the art. This is equally applied in an exemplary embodiment of the present disclosure.

Figure 5A:
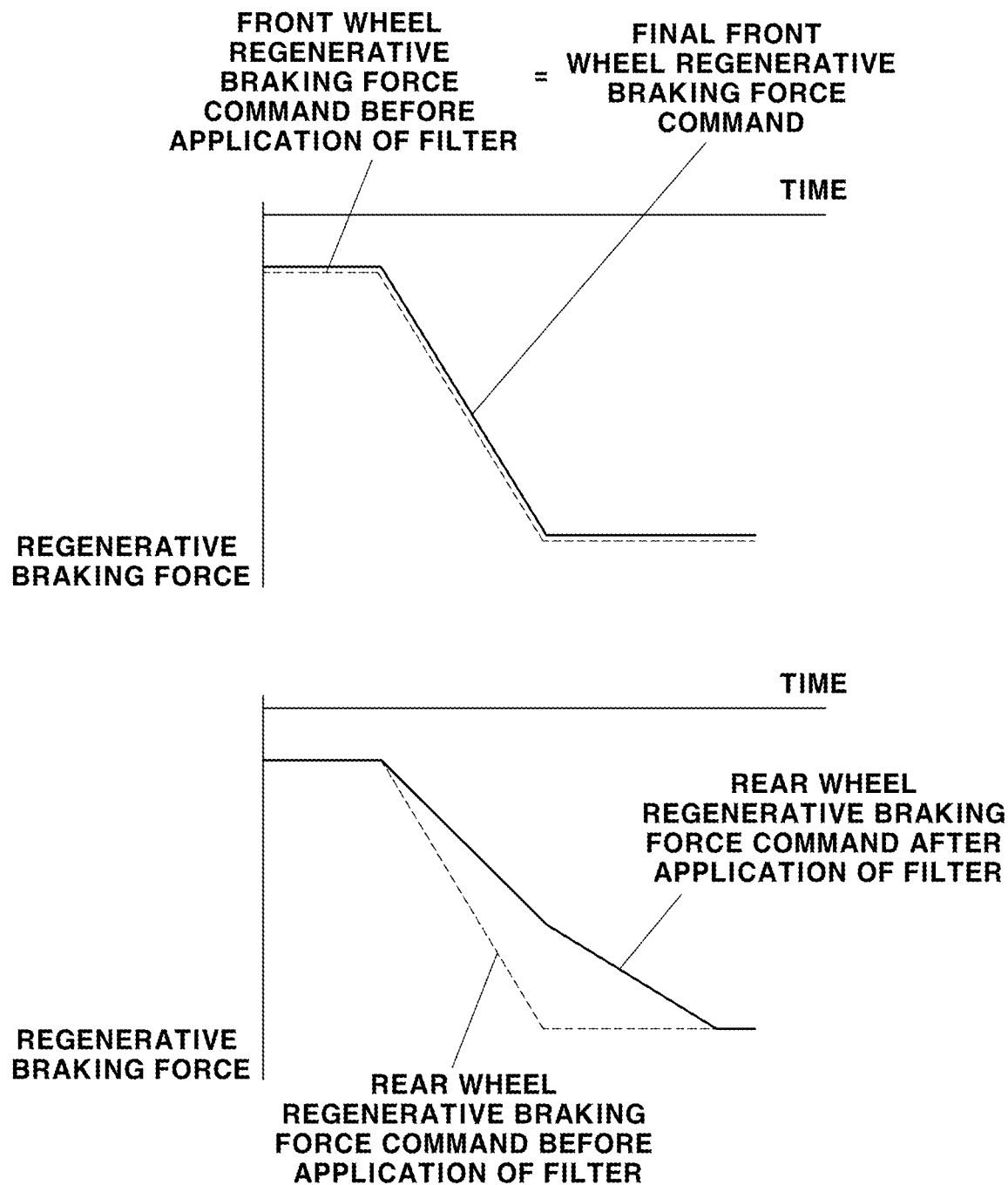
FIG. 5A, FIG. 5B, FIG. 5C, FIG. 5D, FIG. 5E, FIG. 5F, FIG. 5G, and FIG. 5H are diagrams for describing various examples in which a final front wheel regenerative braking force command and a final rear wheel regenerative braking force command are obtained using a natural frequency removal filter in an exemplary embodiment of the present disclosure.

First, as illustrated in FIG. 5A, a control operation may be performed by applying a filter configured to be able to remove the natural frequency component of the transfer function (that is, the natural frequency component of the vehicle suspension pitch motion) from the regenerative braking force command only to the rear wheel regenerative braking force command. After the filter is applied, the rear wheel regenerative braking force command becomes the final rear wheel regenerative braking force command, and the front wheel regenerative braking force command to which the filter is not applied (before the filter is applied) becomes the final front wheel regenerative braking force command.

Figure 5B:
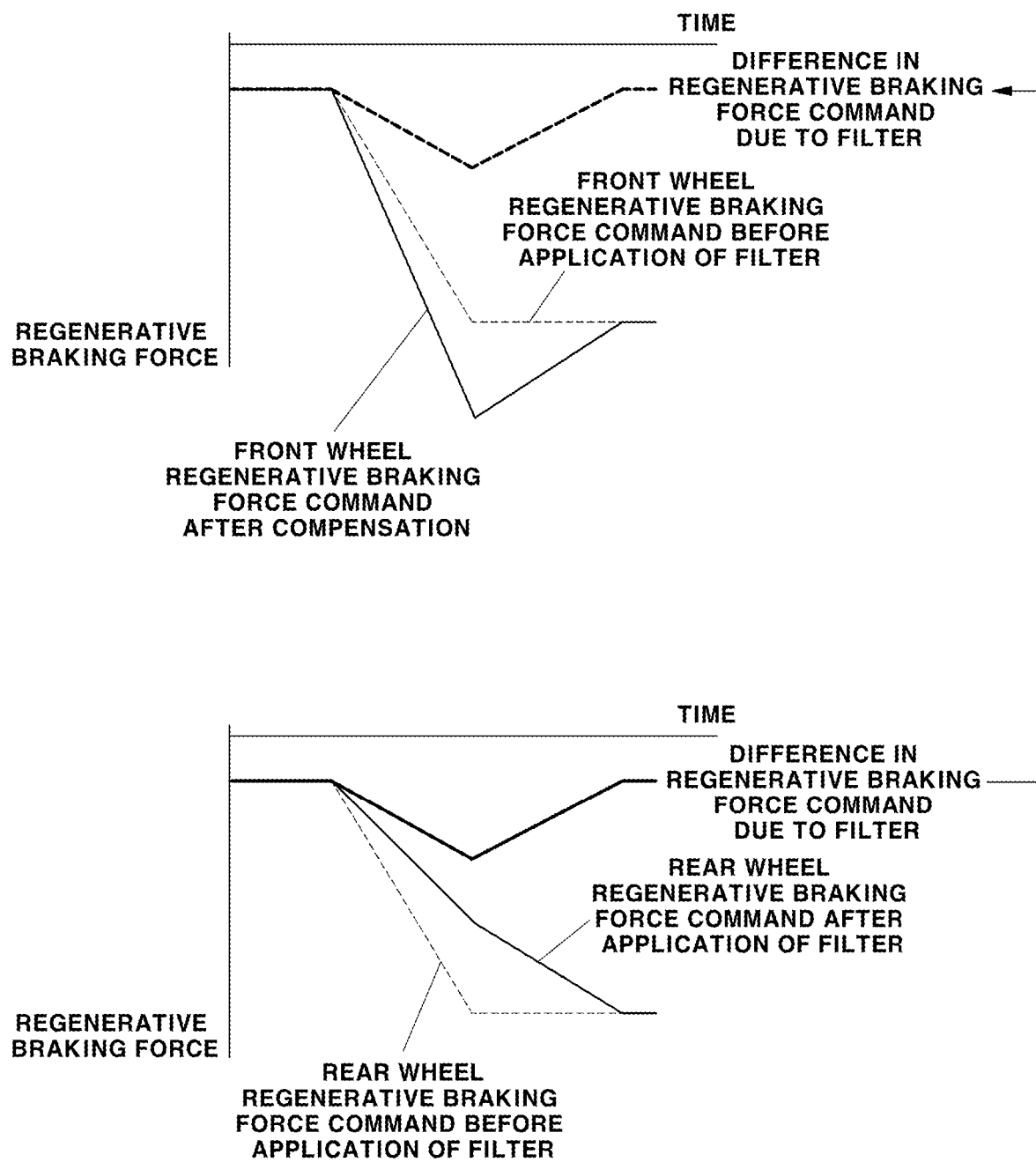

As an exemplary embodiment of the present disclosure, as illustrated in FIG. 5B, the front wheel regenerative braking force command may be corrected by applying the filter only to the rear wheel regenerative braking force command, and compensating for a difference between the rear wheel regenerative braking force command before application of the filter and the rear wheel regenerative braking force command after application of the filter (that is, a difference in the regenerative braking force command due to the filter) in the front wheel regenerative braking force command to which the filter is not applied. In the present instance, compensation may be performed so that the difference between the rear wheel regenerative braking force command before application of the filter and the rear wheel regenerative braking force command after application of the filter is added to the front wheel regenerative braking force command to which the filter is not applied.

As a result, both the front wheel regenerative braking force command and the rear wheel regenerative braking force command are corrected by the filter, the rear wheel regenerative braking force command is determined as a value to which the filter is applied, and the front wheel regenerative braking force command is determined as a value obtained by compensating for the difference between the rear wheel regenerative braking force commands before and after application of the filter.

In the example of FIG. 5B, the rear wheel regenerative braking force command after the filter is applied becomes the final rear wheel regenerative braking force command, and the front wheel regenerative braking force command after compensation becomes the final front wheel regenerative braking force command. In the present instance, both the front wheel regenerative braking force command after the filter is applied and the rear wheel regenerative braking force command after compensation may be referred to as regenerative braking force commands corrected using the filter.

Figure 5C:
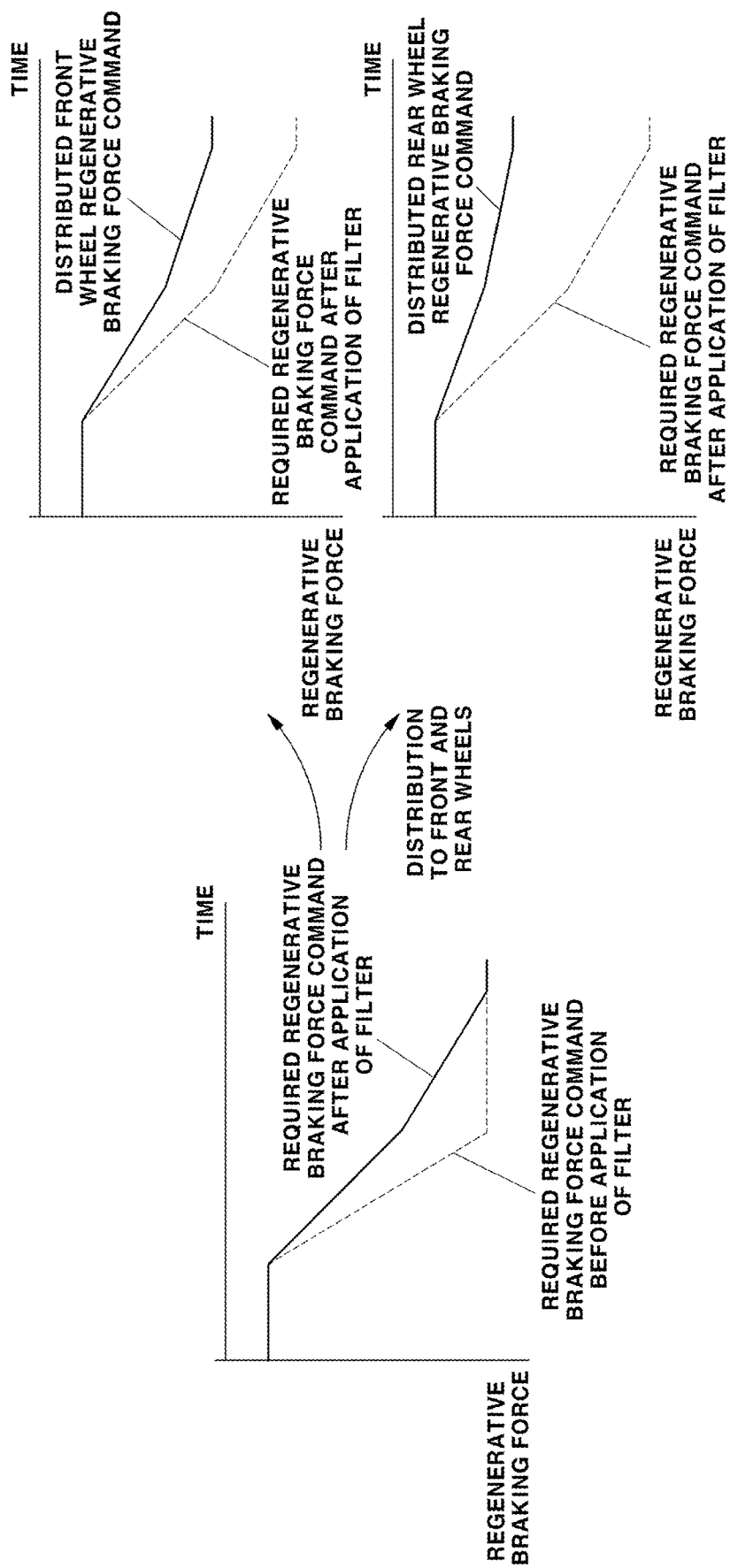

As an exemplary embodiment of the present disclosure, as illustrated in FIG. 5C, it is possible to perform a control operation by applying the filter to the required regenerative braking force command, which is the regenerative braking force command before distribution to the front and rear wheels. At the instant time, after the filter is applied to the required regenerative braking force command, the required regenerative braking force command after application of the filter is distributed to the front and rear wheels according to the front and rear wheel power distribution ratio (hereinafter abbreviated as "power distribution ratio"), so that the front wheel regenerative braking force command and the rear wheel regenerative braking force command are determined.

The required regenerative braking force command is a normal regenerative braking force command (regenerative braking torque command) determined by the control unit based on vehicle driving information, is a regenerative braking force command before power distribution to the front and rear wheels, and is a regenerative braking force command before the filter is applied.

In the present way, the filter may be applied to the required regenerative braking force command, and after the filter is applied to the required regenerative braking force command, the required regenerative braking force command after application of the filter is distributed according to the power distribution ratio, so that the final front wheel regenerative braking force command and the final rear wheel regenerative braking force command may be determined.

Figure 5D:
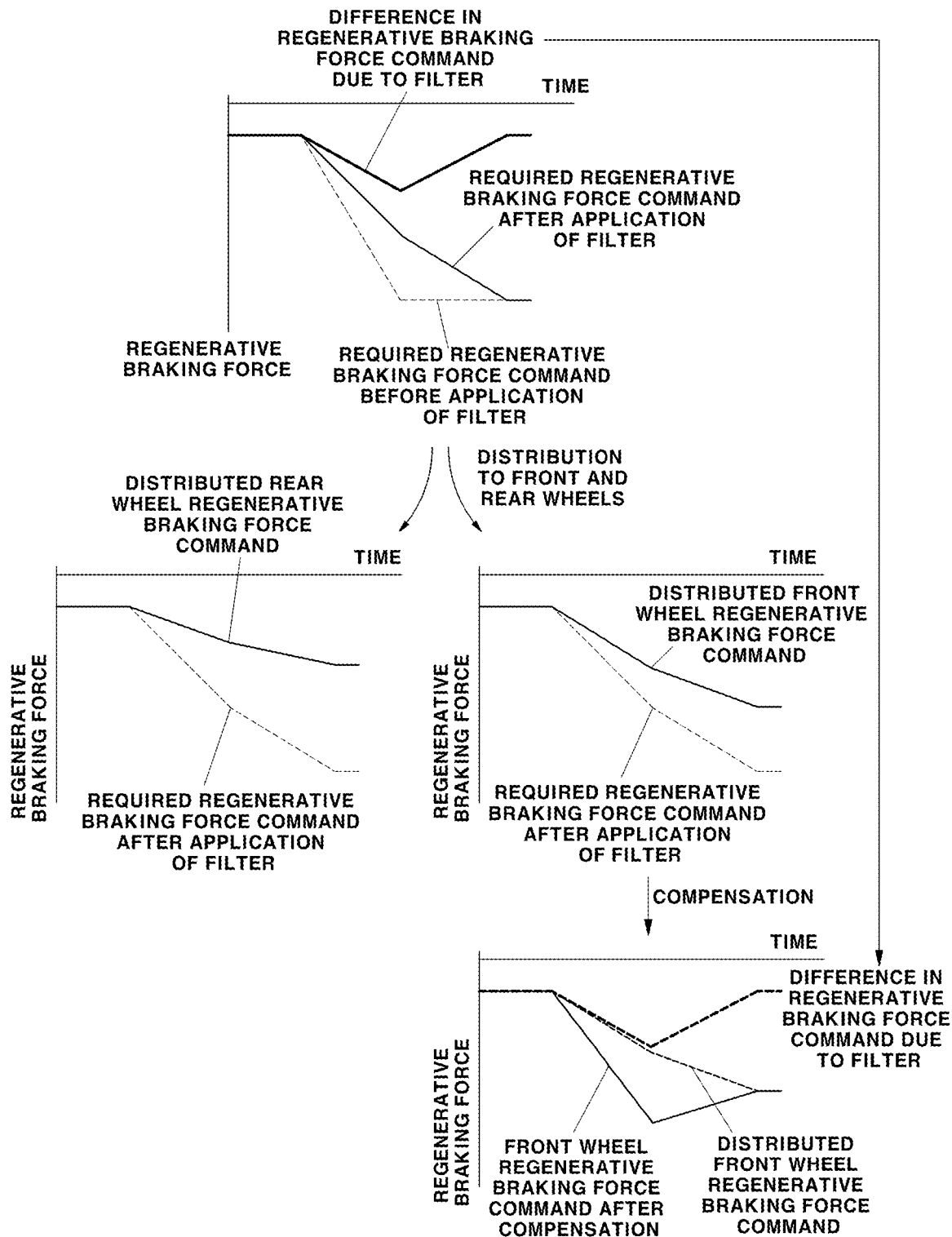

As an exemplary embodiment of the present disclosure, as illustrated in FIG. 5D, the distributed front wheel regenerative braking force command may be corrected using a difference in the regenerative braking force command due to the filter, that is, a difference between the required regenerative braking force command before application of the filter and the required regenerative braking force command after application of the filter. Here, the distributed front wheel regenerative braking force command is a front wheel regenerative braking force command distributed from the required regenerative braking force command after application of the filter.

That is, the front wheel regenerative braking force command may be corrected so that the distributed front wheel regenerative braking force command is compensated by the difference between the required regenerative braking force commands before and after application of the filter, and the front wheel regenerative braking force command after compensation may be used as the final front wheel regenerative braking force command in controlling the regenerative braking of the vehicle.

In the present instance, compensation may be performed by adding the difference between the required regenerative braking force commands before and after application of the filter to the distributed front wheel regenerative braking force command. Furthermore, the rear wheel regenerative braking force command distributed from the required regenerative braking force command after application of the filter is used as the final rear wheel regenerative braking force command.

Figure 5E:
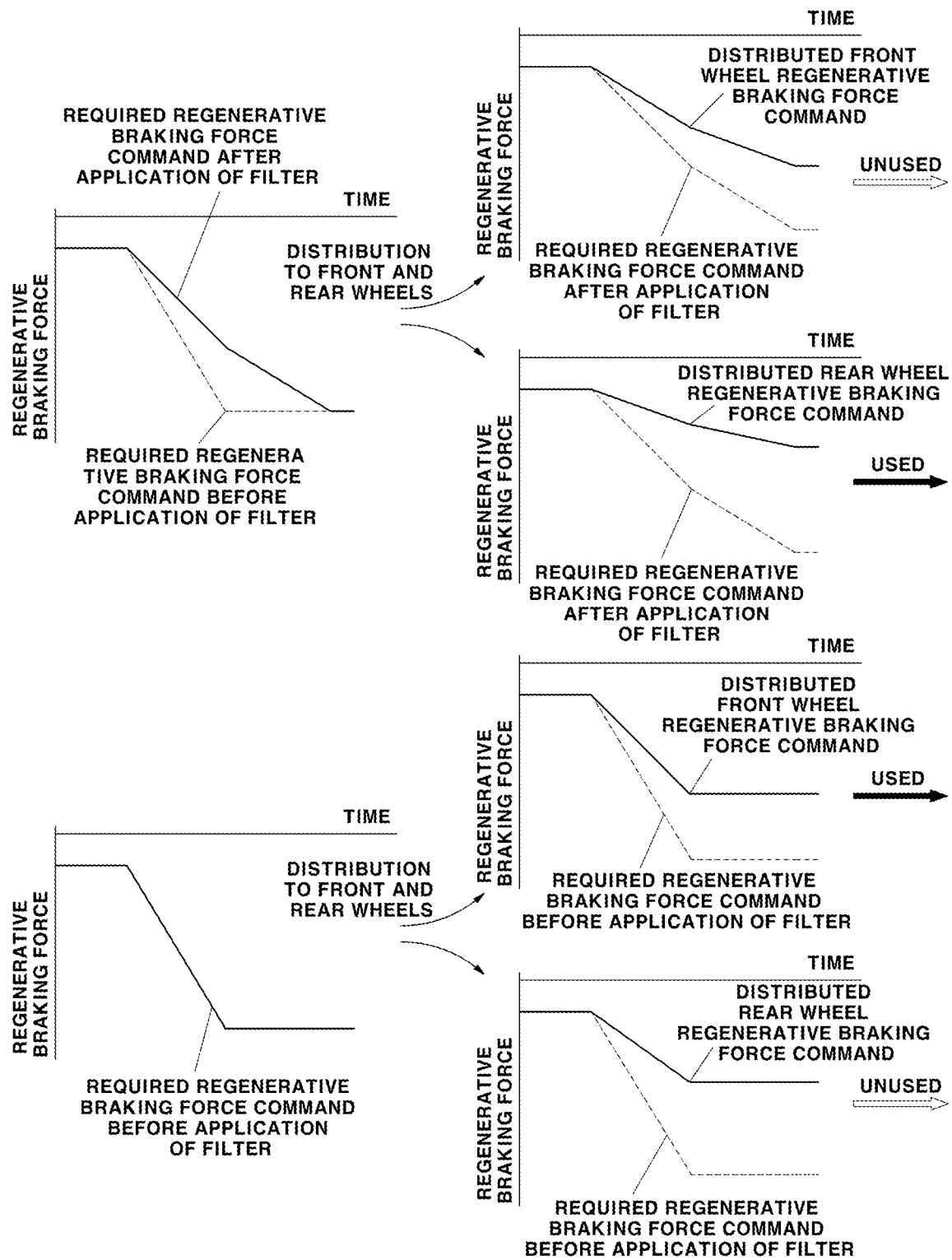

As an exemplary embodiment of the present disclosure, as illustrated in FIG. 5E, after applying the filter to the required regenerative braking force command, each of the required regenerative braking force command after the filter is applied and the required regenerative braking force command before the filter is applied is distributed according to the power distribution ratio, and the rear wheel regenerative braking force command distributed from the required regenerative braking force command after the filter is applied and the front wheel regenerative braking force command distributed from the required regenerative braking force command before the filter is applied may be used as the final front wheel regenerative braking force command and the final rear wheel regenerative braking force command, respectively.

Figure 5F:
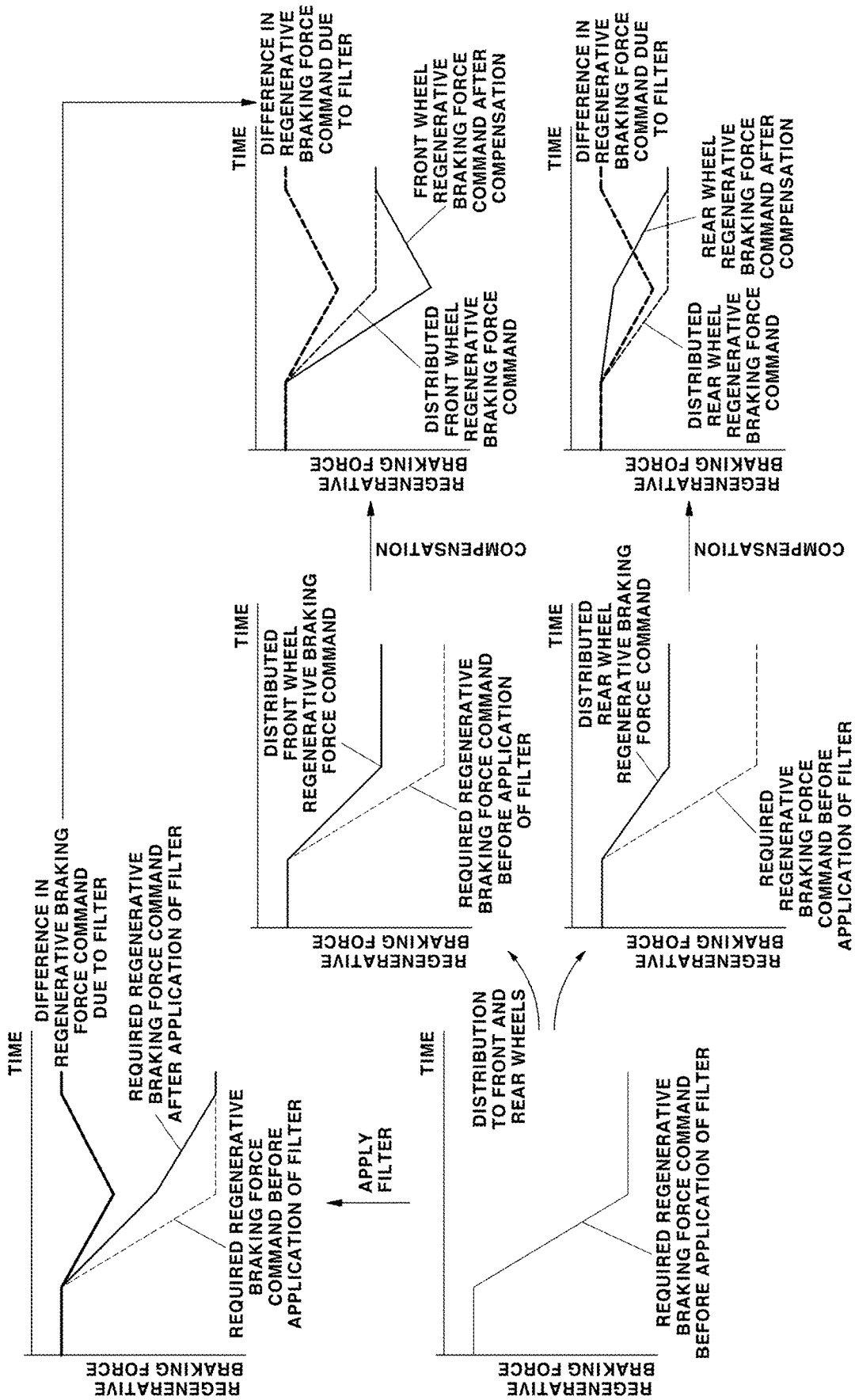

As an exemplary embodiment of the present disclosure, as illustrated in FIG. 5F, after performing correction for compensating each of the front wheel regenerative braking force command and the rear wheel regenerative braking force command distributed from the required regenerative braking force command before application of the filter by a difference between the required regenerative braking force command before application of the filter and the required regenerative braking force command after application of the filter (difference in the regenerative braking force command due to the filter), the front wheel regenerative braking force command after compensation and the rear wheel regenerative braking force command after compensation may be used to control the regenerative braking of the vehicle.

In the present instance, the difference between the required regenerative braking force command before application of the filter and the required regenerative braking force command after application of the filter (difference in the regenerative braking force command due to the filter) may be subtracted from the rear wheel regenerative braking force command distributed from the required regenerative braking force command before application of the filter, and the rear wheel regenerative braking force command after subtraction (that is, after compensation) may be used to control the regenerative braking of the vehicle.

Furthermore, after adding the difference between the required regenerative braking force command before application of the filter and the required regenerative braking force command after application of the filter (difference in the regenerative braking force command due to the filter) to the front wheel regenerative braking force command distributed from the required regenerative braking force command before application of the filter, the front wheel regenerative braking force command after addition (that is, after compensation) may be used to control the regenerative braking of the vehicle.

Furthermore, as in the example of FIG. 5F, when correction is performed to compensate the regenerative braking force command by the difference between the command before application of the filter and the command after application of the filter (difference in the regenerative braking force command due to the filter), a value of the compensated regenerative braking force command (after compensation) may be prevented from becoming smaller or greater than a preset limit value (upper limit and lower limit). That is, the value of the compensated regenerative braking force command (after compensation) is limited so that the value does not become greater than the upper limit, or the value of the compensated regenerative braking force command is limited so that the value does not become smaller than the lower limit.

Here, in determining the difference in the regenerative braking force command due to the filter, the command before application of the filter may be the required regenerative braking force command before application of the filter (see the examples of FIGS. 5D and 5F) or the rear wheel regenerative braking force command before application of the filter (see the example of FIG. 5B). Similarly, the command after application of the filter may be the required regenerative braking force command after application of the filter (see the examples of FIGS. 5D and 5F) or the rear wheel regenerative braking force command after application of the filter (see the example of FIG. 5B).

Furthermore, in limiting the value of the regenerative braking force command after compensation by the difference, that is, the value of the compensated regenerative braking force command, the regenerative braking force command before application of the filter, or a value obtained by multiplying a scale value of 1 or more by the regenerative braking force command before application of the filter may be set and used as a lower limit of the corrected regenerative braking force command. Furthermore, 0 or the regenerative braking force command before application of the filter or a value obtained by multiplying a scale value between 0 and 1 by the regenerative braking force command before application of the filter may be set and used as an upper limit of the corrected regenerative braking force command (see FIG. 5G).

Here, the corrected regenerative braking force command may be the front wheel regenerative braking force command after compensation and the rear wheel regenerative braking force command after compensation compensated by the difference in the regenerative braking force command due to the filter, and the regenerative braking force command before application of the filter used to set the upper limit and the lower limit may be the front wheel regenerative braking force command and the rear wheel regenerative braking force command distributed from the required regenerative braking force command before application of the filter.

Figure 5G:
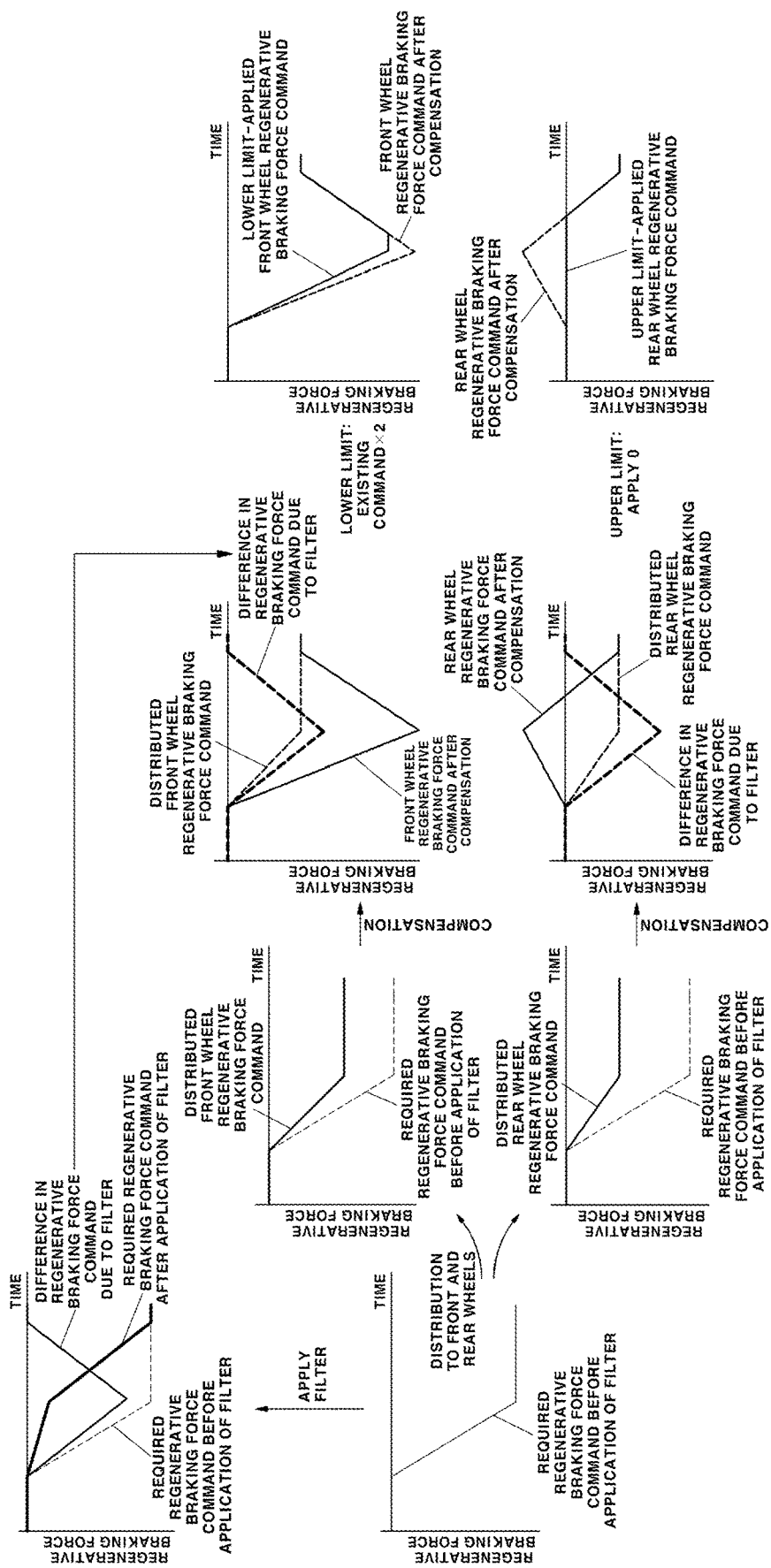

Referring to FIG. 5G, the upper limit is set to 0, and the lower limit is set to a value obtained by multiplying the regenerative braking force command before application of the filter by a scale value of 1 or more (=2). Furthermore, the lower limit is applied to the corrected front wheel regenerative braking force command (after compensation), and the upper limit is applied to the corrected rear wheel regenerative braking force command (after compensation).

The regenerative braking force command before application of the filter used to set the lower limit may be the front wheel regenerative braking force command distributed from the required regenerative braking force command before application of the filter. In the example of FIG. 5G, the upper limit 0 is applied to the corrected rear wheel regenerative braking force command (after compensation) in a state where 0 is set as the upper limit in the control unit, and the rear wheel regenerative braking force command to which the upper limit is applied in the instant way is used as the final rear wheel regenerative braking force command to control the regenerative braking force of the vehicle.

Furthermore, in the example of FIG. 5G, a value obtained by multiplying the front wheel regenerative braking force command distributed from the required regenerative braking force command before application of the filter (that is, the existing command) by a predetermined scale value 2 is set as the lower limit, the lower limit is applied to the corrected front wheel regenerative braking force command (after compensation) in a state where the lower limit is set in the control unit, and the front wheel regenerative braking force command to which the lower limit is applied is used as the final front wheel regenerative braking force command to control the regenerative braking force of the vehicle.

As described above, when a limit value for limiting the regenerative braking force command of the wheel, that is, the upper limit and the lower limit are determined, the rear wheel regenerative braking force command and the front wheel regenerative braking force command determined by applying the upper limit and the lower limit may be directly used for controlling the regenerative braking of the vehicle. However, after modifying the regenerative braking force command of the wheel (front wheel or rear wheel), to which the limit value (upper limit or lower limit) is applied, to determine a modified regenerative braking force command of the wheel (to which the limit value is applied) through a subsequent additional process, the modified regenerative braking force command of the wheel may be used to control the regenerative braking of the vehicle (see FIG. 5H).

Here, the modified regenerative braking force command of the wheel may include a modified upper limit-applied rear wheel regenerative braking force command and a modified lower limit-applied front wheel regenerative braking force command.

In more detail, when the rear wheel regenerative braking force command and the front wheel regenerative braking force command to which the upper or lower limit is applied are determined, a difference between the rear wheel regenerative braking force command distributed from the required regenerative braking force command before application of the filter and the rear wheel regenerative braking force command to which the limit value is applied is determined as the amount of correction of the rear wheel. Here, the rear wheel regenerative braking force command to which the limit value is applied may be the rear wheel regenerative braking force command to which the upper limit is applied.

That is, when the upper limit is applied to the corrected rear wheel regenerative braking force command (after compensation) to determine the rear wheel regenerative braking force command to which the upper limit is applied, a difference between the distributed rear wheel regenerative braking force command and the rear wheel regenerative braking force command to which the upper limit is applied is determined and determined as the amount of correction of the rear wheel.

Similarly, a difference between the front wheel regenerative braking force command distributed from the required regenerative braking force command before application of the filter and the front wheel regenerative braking force command to which the limit value is applied is determined as the amount of correction of the front wheel. Here, the front wheel regenerative braking force command to which the limit value is applied may be the front wheel regenerative braking force command to which the lower limit is applied.

That is, when the lower limit is applied to the corrected front wheel regenerative braking force command (after compensation) to determine the front wheel regenerative braking force command to which the lower limit is applied, a difference between distributed the front wheel regenerative braking force command and the front wheel regenerative braking force command to which the lower limit is applied is determined and determined as the amount of correction of the front wheel.

Furthermore, when the amount of correction of the rear wheel and the amount of correction of the front wheel are determined as described above, the absolute value of the determined amount of correction of the rear wheel is compared with the absolute value of the determined amount of correction of the front wheel, and a wheel having the small absolute value of the correction amount and a wheel having the large absolute value of the correction amount are determined.

Then, the correction amount on the wheel side including small absolute value of the correction amount (that is, the correction amount including a relatively small absolute value) is determined and set as an upper limit of the correction amount on the wheel side including a large absolute value of the correction amount. Furthermore, a value obtained by multiplying the correction amount on the wheel side including a small absolute value of the correction amount (that is, the correction amount including a relatively small absolute value) by −1 is determined and set as a lower limit of the correction amount on the wheel side including a large absolute value of the correction amount.

Subsequently, the correction amount on the wheel side including the large absolute value of the correction amount is limited to the upper limit and the lower limit of the correction amount to modify the correction amount, the modified correction amount and the distributed regenerative braking force command of the corresponding wheel are summed, and the sum value is determined as the modified regenerative braking force command of the corresponding wheel, that is, the modified, limit value-applied regenerative braking force command of the corresponding wheel. Furthermore, the modified regenerative braking force command of the corresponding wheel determined in the instant way is used to control the regenerative braking of the vehicle.

In the present instance, in the case of a wheel including a small absolute value of the correction amount, the regenerative braking force command (after compensation), which is corrected using the method described with reference to FIG. 5G, may be used to control the regenerative braking of the vehicle without change.

In summary, after comparing the absolute value of the correction amount of the front wheel with the absolute value of the correction amount of the rear wheel to determine a first wheel including a small absolute value of the correction amount and a second wheel including a large absolute value of the correction amount in the front wheel and the rear wheel, the correction amount on the first wheel side is determined as an upper limit of the correction amount on the second wheel side, and a value obtained by multiplying the correction amount on the first wheel side by −1 is determined as a lower limit of the correction amount on the second wheel side.

Accordingly, the regenerative braking force command on the second wheel side to which the upper limit or the lower limit is applied is modified based on the determined upper limit of the correction amount on the second wheel side and the correction amount on the second wheel side limited to the lower limit of the correction amount on the second wheel side, and the modified regenerative braking force command on the second wheel side is determined as the front wheel regenerative braking force command or the rear wheel regenerative braking force command for controlling the regenerative braking.

In the example of FIG. 5G, the lower limit is applied to the corrected front wheel regenerative braking force command, and the front wheel regenerative braking force command limited by the lower limit is used to control the regenerative braking of the vehicle. Furthermore, the upper limit is applied to the corrected rear wheel regenerative braking force command, and the rear wheel regenerative braking force command limited by the upper limit is used to control the regenerative braking of the vehicle.

Figure 5H:
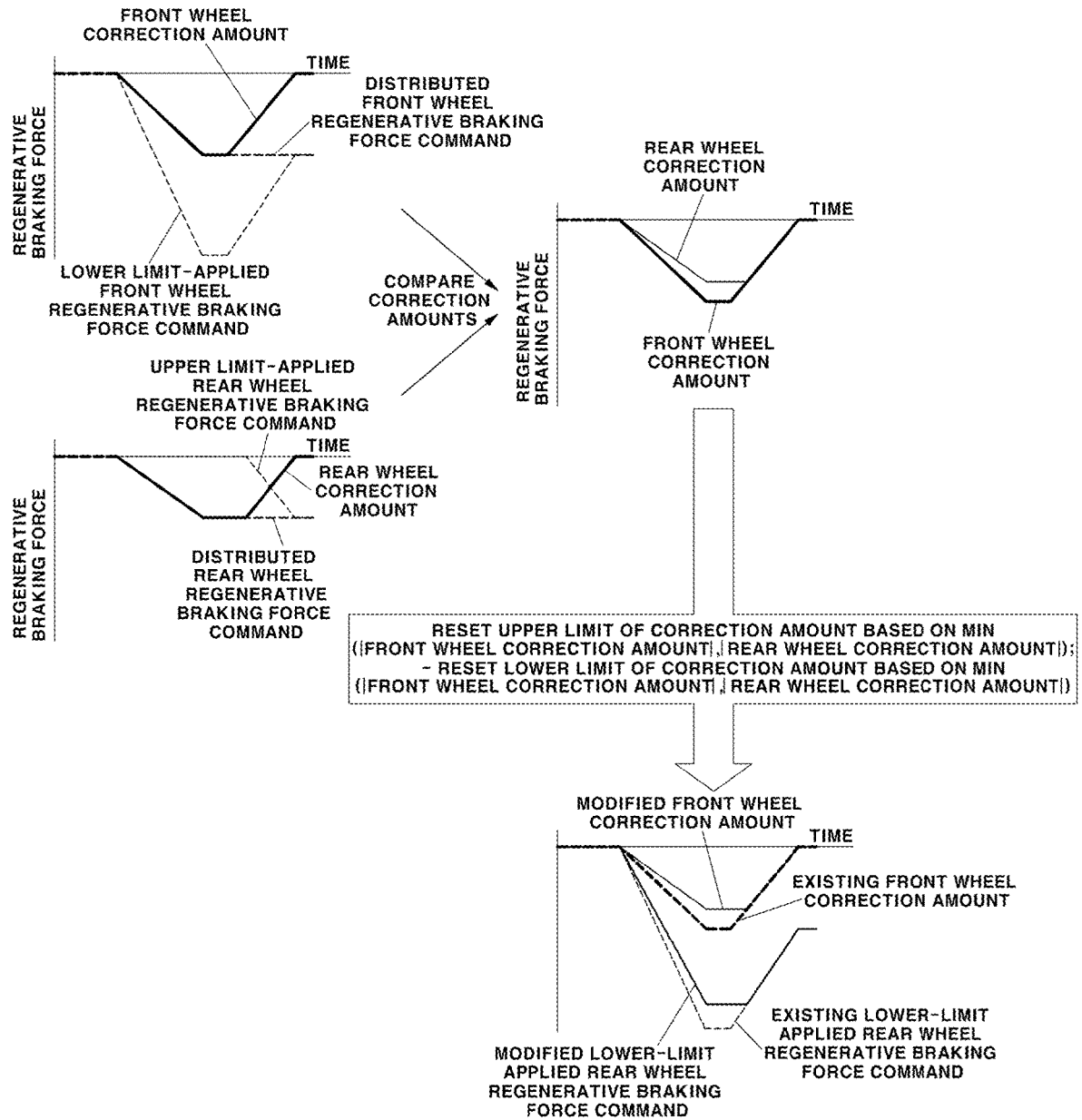

Furthermore, in the example of FIG. 5H, the absolute value of the correction amount of the rear wheel is smaller than the absolute value of the correction amount of the front wheel, and accordingly, the correction amount of the rear wheel is set as the upper limit of the correction amount of the front wheel. As described above, in the example of FIG. 5H, the rear wheel is the first wheel and the front wheel is the second wheel.

At the present time, a value obtained by multiplying the absolute value of the correction amount of the rear wheel by −1 is set as the lower limit of the correction amount of the front wheel. As a result, the correction amount of the front wheel is limited by the correction amount of the rear wheel. In the illustrated example, all the absolute values of the correction amount of the front wheel are greater than the absolute value of the correction amount of the rear wheel. In the instant case, the correction amount of the front wheel becomes the same as the correction amount of the rear wheel.

Accordingly, the modified lower limit-applied front wheel regenerative braking force command may be determined by applying the modified correction amount of the front wheel. At the instant time, the front wheel regenerative braking force command distributed from the required regenerative braking force command before application of the filter is added to the modified correction amount of the front wheel, and the summed value becomes the modified lower limit-applied front wheel regenerative braking force command.

Accordingly, the modified lower limit-applied front wheel regenerative braking force command is used as the final front wheel regenerative braking force command to control the regenerative braking force of the front wheel in controlling the regenerative braking of the vehicle. In the present instance, the final rear wheel regenerative braking force becomes the rear wheel regenerative braking force command determined in the example of FIG. 5G, that is, the rear wheel regenerative braking force to which the upper limit is applied.

Furthermore, the control unit may determine whether to apply the filter based on real-time vehicle driving information. Furthermore, when the filter is applied to the regenerative braking force command as described above in the control unit, it is possible to apply a weight determined based on current vehicle driving information.

That is, to set the vehicle drivability, it is necessary to apply the filter only to a specific region of the vehicle driving state, and it is necessary to change whether the filter intervenes and a weight of filter application according to the vehicle driving state. Accordingly, it is possible to determine whether to apply the filter according to the vehicle driving state by a state variable map preset in the control unit (the first control unit 20), and a weight according to the vehicle driving state may be obtained and used by the state variable map.

In various exemplary embodiments of the present disclosure, information indicating the vehicle driving state for determining whether to apply the filter and the weight of the filter application, that is, vehicle driving information, may include at least one of regenerative braking torque, a drive system speed, a vehicle speed, or a driver driving input value.

Here, the regenerative braking torque may be a current regenerative braking force command value or a regenerative braking force command value of an immediately preceding control cycle. Alternatively, the regenerative braking torque may be an estimated regenerative braking torque value which may be generated when the current regenerative braking force command is applied or when the regenerative braking force command of the immediately preceding control cycle is used.

In the present instance, the current regenerative braking force command or the regenerative braking force command of the immediately preceding control cycle may be the required regenerative braking force command before application of the filter or the required regenerative braking force command after application of the filter. Furthermore, the drive system speed, the vehicle speed, and the driver driving input value may be sensor detection information detected by the sensor 10, and the driver driving input value may be a braking pedal input value (BPS value) of the driver.

In the control unit (the first control unit 20), the weight may be determined by the state variable map, and not only the weight but also whether to apply the filter may be determined by one state variable map taking the vehicle driving information as input.

To the present end, a state variable map taking the vehicle driving information as input and taking whether to apply the filter and weight information as output may be used while being previously input and stored in the control unit. In the present instance, in the state variable map, a filter application region and a filter non-application region may be separately set based on the vehicle driving state. Furthermore, in the case of the filter application region, a weight may be set as a value according to the vehicle driving state.

As an example of weight application, when a weight determined by the state variable map is a, a sum value of a value obtained by multiplying the regenerative braking force command after application of the filter by a and a value obtained by multiplying the regenerative braking force command before application of the filter by 1−α may be determined as a command after application of the final filter.

Weights α and 1−α corresponding to the current vehicle driving state are determined using the state variable map from the vehicle driving information, and the front wheel regenerative braking force command and the rear wheel regenerative braking force command distributed from the required regenerative braking force command according to the power distribution ratio are determined without a limit value application process using the limit value.

Subsequently, values obtained by applying the determined weights α and 1−α to a final front wheel regenerative braking force command determined without the limit value application process using the limit value and a final front wheel regenerative braking force command obtained through the limit value application process using the limit value, respectively, are summed.

Furthermore, values obtained by applying the determined weights α and 1−α to a final rear wheel regenerative braking force command determined without the limit value application process using the limit value and a final rear wheel regenerative braking force command obtained through the limit value application process using the limit value, respectively, are summed.

Finally, the front wheel regenerative braking force command and the rear wheel regenerative braking force command obtained by the summing are determined as the final front wheel regenerative braking force command and the final rear wheel regenerative braking force command.

Alternatively, as another example of applying the weight, it is possible to adjust the filter gain according to the weight, and in the present instance, the filter gain obtained by multiplying by the weight may be used. In the state variable map, a weight α may be set to 0 in the filter non-application region.

The regenerative braking control process described above with reference to FIG. 3 is summarized as follows.

As illustrated in FIG. 3, the vehicle driving information is obtained in real time while the vehicle is driven (step S1), and the required regenerative braking force command is determined based on the vehicle driving information obtained by the control unit (the first control unit 20) (step S2).

Accordingly, the control unit (the first control unit 20) determines whether the current vehicle driving state satisfies a condition for applying the filter in the state variable map, that is, whether the current vehicle driving state corresponds to the filter application region (step S3).

Upon determining that the current vehicle driving state does not correspond to the filter application region (weight α=0), the control unit is configured to determine the final front wheel regenerative braking force command and the final rear wheel regenerative braking force command from the required regenerative braking force command to which the filter is not applied (step S6), and then is configured to control the regenerative braking force of the vehicle according to the determined final front wheel regenerative braking force command and the determined final rear wheel regenerative braking force command (step S7).

On the other hand, upon determining that the current vehicle driving state corresponds to the filter application region, the control unit is configured to apply the filter to the regenerative braking force command (for example, the front wheel regenerative braking force command) (step S4), then determines a difference in the regenerative braking force command due to the filter, and then performs correction for compensating the regenerative braking force command (for example, the rear wheel regenerative braking force command) by the difference (step S5). Subsequently, the determined front wheel regenerative braking force command and rear wheel regenerative braking force command are determined as the final front wheel regenerative braking force command and the final rear wheel regenerative braking force command, respectively (step S6).

Furthermore, the regenerative braking force of the vehicle is controlled according to the determined final front wheel regenerative braking force command and the determined final rear wheel regenerative braking force command (step S7). In determining the final front wheel regenerative braking force command and the final rear wheel regenerative braking force command, it is possible to apply a weight determined by the state variable map as described above.

Next, as another exemplary embodiment of the present disclosure, instead of the filter configured to remove the natural frequency component of the transfer function (that is, the natural frequency removal filter), a filter configured to be able to pass the natural frequency component of the transfer function may be set in the control unit and used.

Here, passing the natural frequency component has the meaning of enhancing the natural frequency component in the regenerative braking force command. Accordingly, in an exemplary embodiment of the present disclosure, the filter that passes the natural frequency component (that is, a natural frequency pass filter) may refer to a filter that enhances the natural frequency component (that is, the natural frequency enhancement filter).

FIG. 6A, FIG. 6B, FIG. 6C, FIG. 6D, FIG. 6E and FIG. 6F are diagrams for describing various examples in which a final front wheel regenerative braking force command and a final rear wheel regenerative braking force command are obtained using a filter that passes the natural frequency component of the transfer function in an exemplary embodiment of the present disclosure, and illustrate examples using the filter configured for enhancing the natural frequency component of the vehicle suspension pitch motion in the regenerative braking force command. In FIG. 6A, FIG. 6B, FIG. 6C, FIG. 6D, FIG. 6E and FIG. 6F, a vertical axis represents regenerative braking force and a horizontal axis represents time.

In an exemplary embodiment using the filter that passes the natural frequency component of the transfer function, it is possible to use a method of applying the filter to the regenerative braking force command, and then adding the regenerative braking force command after application of the filter to the regenerative braking force command before application of the filter or subtracting the regenerative braking force command after application of the filter from the regenerative braking force command before application of the filter.

The exemplary embodiment using the natural frequency pass (reinforcement) filter will be described in more detail. First, the filter that passes the natural frequency component may be applied only to the front wheel regenerative braking force command distributed according to the power distribution ratio as illustrated in FIG. 6A and FIG. 6B.

That is, when the required regenerative braking force command is distributed according to the power distribution ratio and the front wheel regenerative braking force command and the rear wheel regenerative braking force command are determined, the filter is applied only to the front wheel regenerative braking force command in the distributed front wheel regenerative braking force command and rear wheel regenerative braking force command.

Figure 6A:
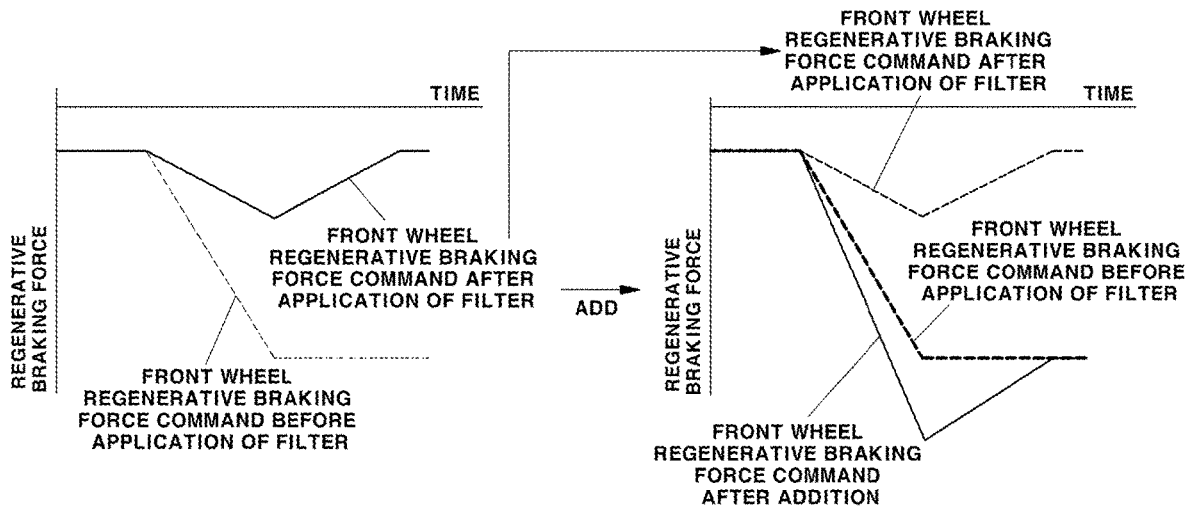
FIG. 6A, FIG. 6B, FIG. 6C, FIG. 6D, FIG. 6E and FIG. 6F are diagrams for describing various examples in which a final front wheel regenerative braking force command and a final rear wheel regenerative braking force command are obtained using a natural frequency enhancement (pass) filter in an exemplary embodiment of the present disclosure.
Figure 6B:
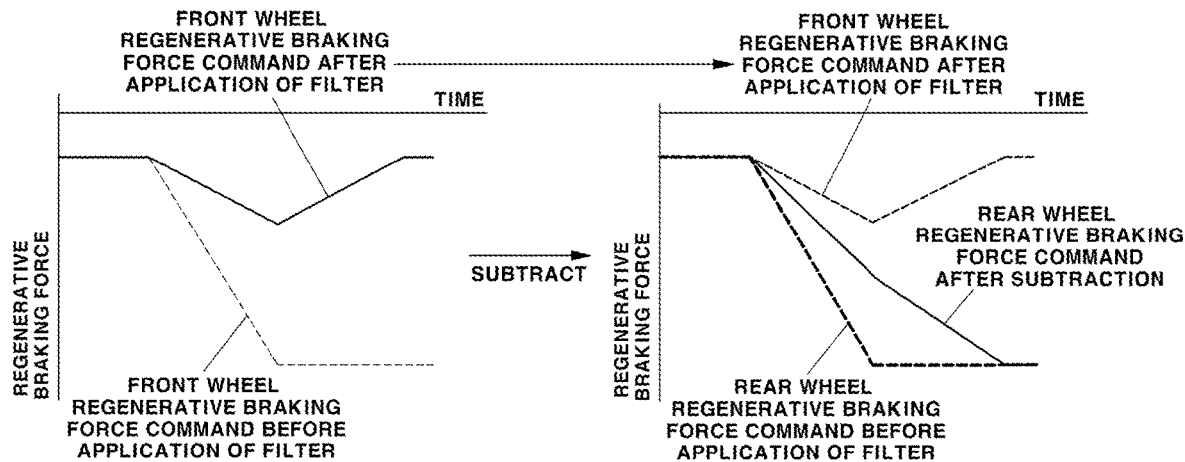

Accordingly, as illustrated in FIG. 6A, the front wheel regenerative braking force command after application of the filter may be added to the front wheel regenerative braking force command before application of the filter, and the front wheel regenerative braking force command after addition may be used as the final front wheel regenerative braking force command to control the regenerative braking of the vehicle.

In the present instance, as the final rear wheel regenerative braking force command, it is possible to use the rear wheel regenerative braking force command distributed according to the power distribution ratio without change. That is, the rear wheel regenerative braking force command to which the filter is not applied after being distributed may be used to control the regenerative braking of the vehicle without change.

Alternatively, the required regenerative braking force command is distributed according to the power distribution ratio to determine the front wheel regenerative braking force command and the rear wheel regenerative braking force command, the filter is applied only to the front wheel regenerative braking force command in the distributed front wheel regenerative braking force command and rear wheel regenerative braking force command, and then the front wheel regenerative braking force command after application of the filter is subtracted from the rear wheel regenerative braking force command to which the filter is not applied (that is, before application of the filter) as illustrated in FIG. 6B.

In the present way, the front wheel regenerative braking force command after application of the filter may be subtracted from the rear wheel regenerative braking force command to which the filter is not applied (that is, before application of the filter), and the rear wheel regenerative braking force command after subtraction may be used as the final rear wheel regenerative braking force command to control the regenerative braking control of the vehicle. At the instant time, the front wheel regenerative braking force command after application of the filter may be used as the final front wheel regenerative braking force command to control the regenerative braking control of the vehicle.

Figure 6C:
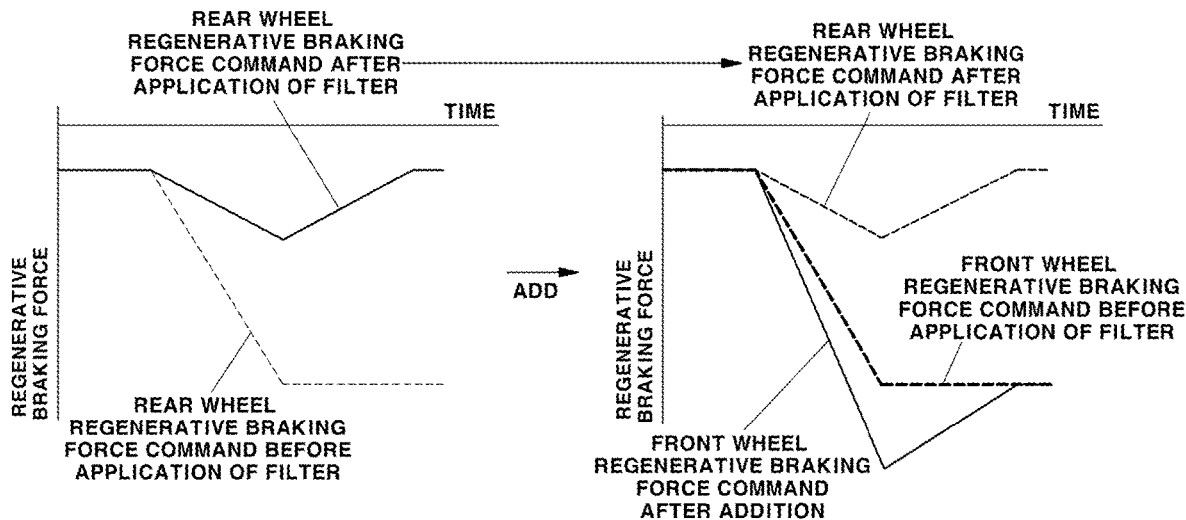
Figure 6D:
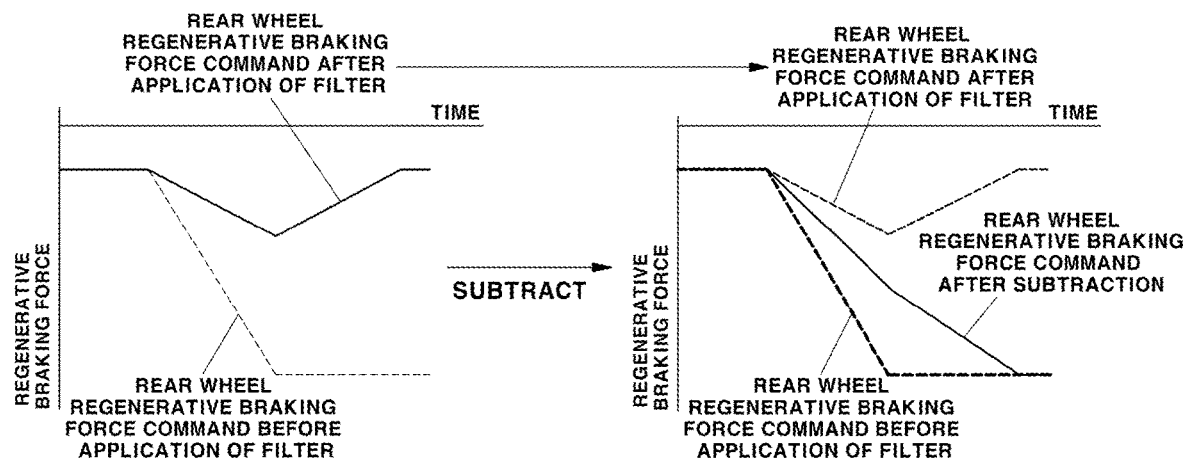

Alternatively, the filter that passes the natural frequency component may be applied only to the rear wheel regenerative braking force command distributed according to the power distribution ratio as illustrated in FIGS. 6C and 6D.

That is, when the required regenerative braking force command is distributed according to the power distribution ratio, and the front wheel regenerative braking force command and the rear wheel regenerative braking force command are determined, the filter is applied only to the rear wheel regenerative braking force command in the distributed front wheel regenerative braking force command and rear wheel regenerative braking force command.

Accordingly, as illustrated in FIG. 6C, the rear wheel regenerative braking force command after application of the filter may be added to the front wheel regenerative braking force command to which the filter is not applied (that is, before application of the filter), and the front wheel regenerative braking force command after addition may be used as the final front wheel regenerative braking force command to control the regenerative braking of the vehicle.

In the present instance, the rear wheel regenerative braking force command after application of the filter may be used as the final rear wheel regenerative braking force command to control the regenerative braking of the vehicle.

Alternatively, the required regenerative braking force command is distributed according to the power distribution ratio to determine the front wheel regenerative braking force command and the rear wheel regenerative braking force command, the filter is applied only to the rear wheel regenerative braking force command in the distributed front wheel regenerative braking force command and rear wheel regenerative braking force command, and then the rear wheel regenerative braking force command after application of the filter is subtracted from the rear wheel regenerative braking force command before application of the filter as illustrated in FIG. 6D.

In the present instance, the rear wheel regenerative braking force command after application of the filter may be subtracted from the rear wheel regenerative braking force command before application of the filter, and the rear wheel regenerative braking force command after subtraction may be used as the final rear wheel regenerative braking force command to control the regenerative braking of the vehicle.

Furthermore, as the final front wheel regenerative braking force command, it is possible to use the front wheel regenerative braking force command distributed according to the power distribution ratio without change. That is, the front wheel regenerative braking force command to which the filter is not applied before distribution may be used to control the regenerative braking of the vehicle without change.

Furthermore, the filter that passes the natural frequency component may be applied to the required regenerative braking force command.

In the present instance, after applying the filter to the required regenerative braking force command, the required regenerative braking force command obtained by applying the filter, that is, the required regenerative braking force command after application of the filter, may be added to the required regenerative braking force command before application of the filter, and the sum value may be determined as the required regenerative braking force command. Alternatively, the required regenerative braking force command after application of the filter may be subtracted from the required regenerative braking force command before application of the filter, and the subtracted value may be determined as the required regenerative braking force command.

Accordingly, the required regenerative braking force command determined in the instant way may be distributed according to the power distribution ratio to determine the front wheel regenerative braking force command and the rear wheel regenerative braking force command, and the determined front wheel regenerative braking force command and rear wheel regenerative braking force command may be used as a final regenerative braking force command to control the regenerative braking of the vehicle.

Figure 6E:
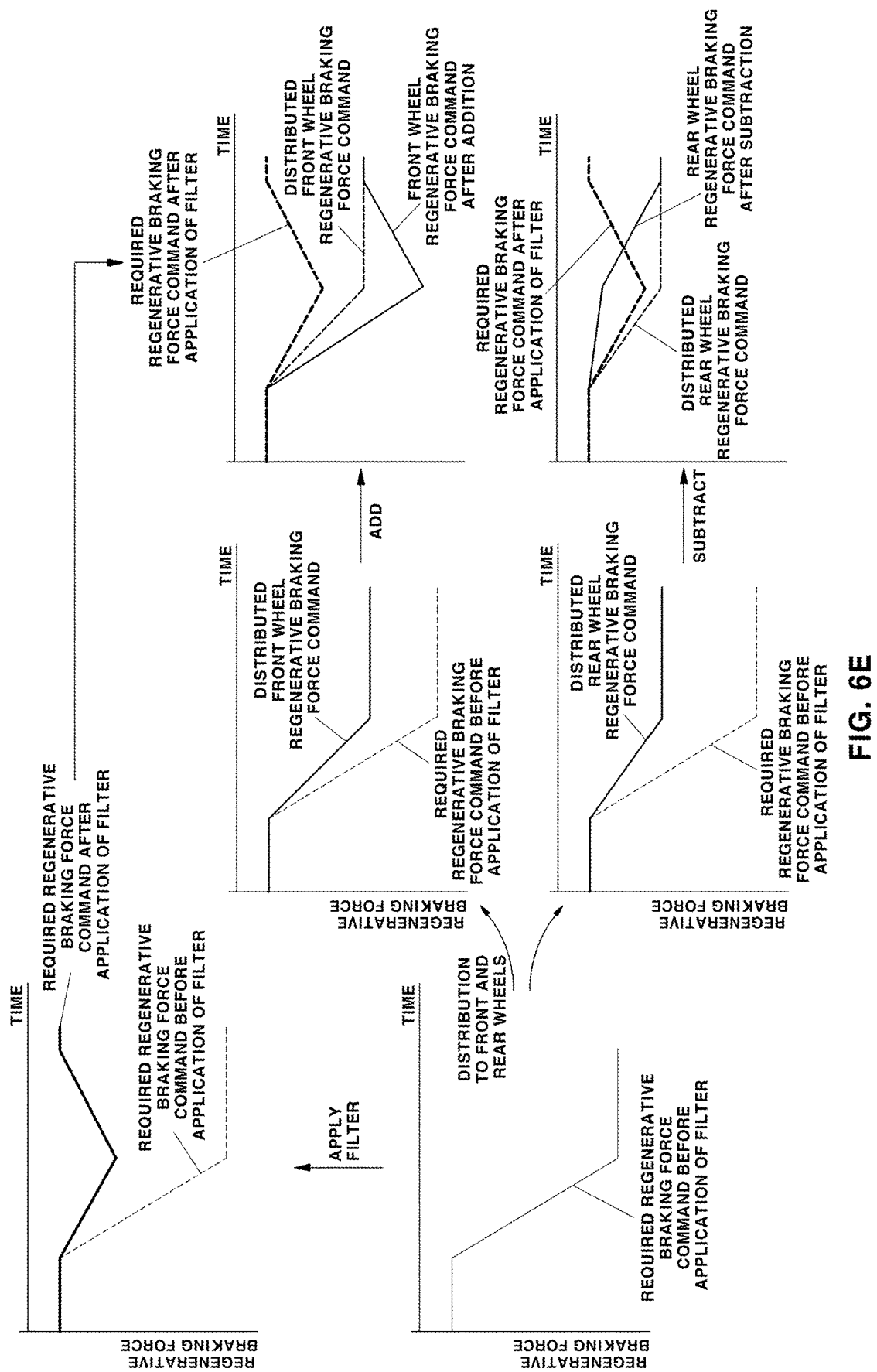

Alternatively, as illustrated in FIG. 6E, the filter is applied to the required regenerative braking force command, and the required regenerative braking force command to which the filter is not applied (that is, before application of the filter) is distributed according to the power distribution ratio to determine the front wheel regenerative braking force command and the rear wheel regenerative braking force command.

Accordingly, the distributed front wheel regenerative braking power command is added to the required regenerative braking power command after application of the filter, and the front wheel regenerative braking power command after addition is used as the final front wheel regenerative braking power command to control the regenerative braking of the vehicle.

Similarly, the required regenerative braking force command after application of the filter is subtracted from the distributed rear wheel regenerative braking force command, and the rear wheel regenerative braking power command after subtraction is used as the final rear wheel regenerative braking power command to control the regenerative braking of the vehicle.

Figure 6F:
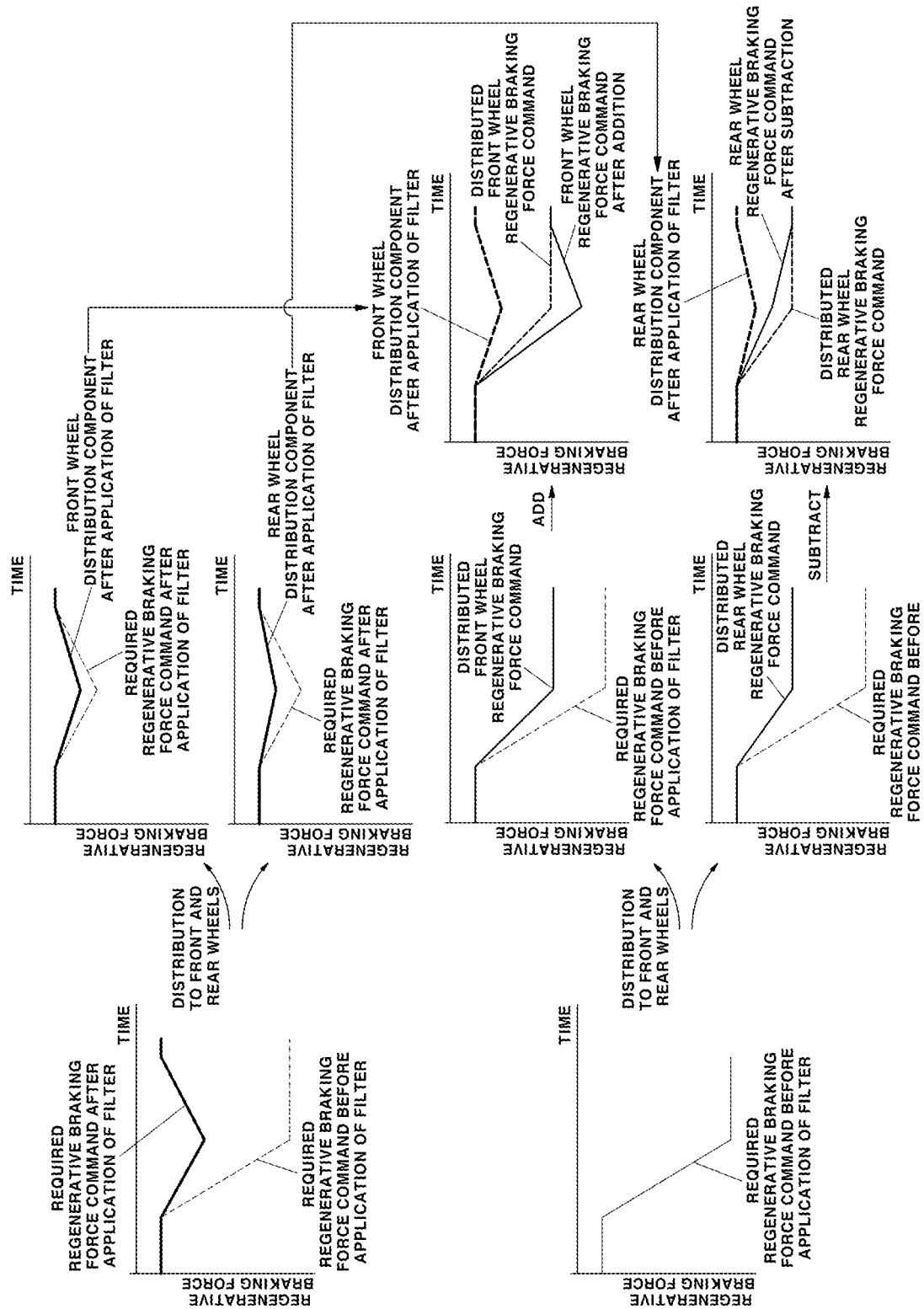

Alternatively, as illustrated in FIG. 6F, the filter is applied to the required regenerative braking force command, and the required regenerative braking force command to which the filter is not applied (that is, before application of the filter) is distributed according to the power distribution ratio of the front wheel and the rear wheel to determine the front wheel regenerative braking force command and the rear wheel regenerative braking power command.

Subsequently, the required regenerative braking force command to which the filter is applied, that is, the required regenerative braking force command after application of the filter, is distributed according to the power distribution ratio of the front wheel and the rear wheel to determine a front wheel distribution component and a rear wheel distribution component. Here, the front wheel distribution component after application of the filter is a regenerative braking force command part distributed to the front wheel side in the required regenerative braking force command after application of the filter, and the rear wheel distribution component after application of the filter is a remaining regenerative braking force command part distributed to the rear wheel side in the required regenerative braking force command after application of the filter.

Subsequently, the front wheel regenerative braking force command distributed from the required regenerative braking force command before application of the filter is added to the front wheel distribution component after application of the filter, and the front wheel regenerative braking force command after addition is used as the final front wheel regenerative braking force command to control the regenerative braking of the vehicle.

Similarly, the rear wheel distribution component after application of the filter is subtracted the rear wheel regenerative braking force command distributed from the required regenerative braking force command before application of the filter, and the rear wheel regenerative braking force command after subtraction is used as the final rear wheel regenerative braking force command to control the regenerative braking of the vehicle.

Furthermore, in the case of applying the natural frequency pass filter, as in the case of applying the natural frequency removal filter, values of the front wheel regenerative braking force command after addition and the rear wheel regenerative braking force command after subtraction may be prevented from becoming smaller or greater than a preset limit value (upper limit or lower limit). That is, the value of the front wheel regenerative braking force command after addition or the rear wheel regenerative braking force command after subtraction is limited so that the value does not become greater than the upper limit or does not become smaller than the lower limit.

In limiting the values of the front wheel regenerative braking force command after addition and the rear wheel regenerative braking force command after subtraction, the regenerative braking force command before application of the filter or a value obtained by multiplying a scale value of 1 or more by the regenerative braking force command before application of the filter may be set as a lower limit of the front wheel regenerative braking force command after addition or the rear wheel regenerative braking force command after subtraction and used.

Furthermore, 0 or the regenerative braking force command before application of the filter or a value obtained by multiplying a scale value between 0 and 1 by the regenerative braking force command before application of the filter may be set as an upper limit of the front wheel regenerative braking force command after addition or the rear wheel regenerative braking force command after subtraction and used. Here, the regenerative braking force command before application of the filter may be the front wheel regenerative braking force command and the rear wheel regenerative braking force command distributed from the required regenerative braking force command before application of the filter.

As a result, the final front wheel regenerative braking force command or rear wheel regenerative braking force command obtained in the examples of FIG. 6A, FIG. 6B, FIG. 6C, FIG. 6D, FIG. 6E and FIG. 6F, for example, the front wheel regenerative braking force command after addition or the rear wheel regenerative braking force command after subtraction in the example of FIG. 6F may be limited so that the command does not become greater than the upper limit or does not become smaller than the lower limit, and limited values may be obtained as the final front wheel regenerative braking force command and the final rear wheel regenerative braking force command and used to control the regenerative braking of the vehicle.

In the present instance, the lower limit may be applied to the front wheel regenerative braking force command after addition, and the upper limit may be applied to the rear wheel regenerative braking force command after subtraction.

In addition to applying these upper and lower limits, as described with reference to FIG. 5H, after determining the regenerative braking force command of the wheel to which the modified limit value is applied through a subsequent additional process, the regenerative braking force command of the wheel to which the modified limit value is applied may be used to control the regenerative braking of the vehicle.

Here, the regenerative braking force command of the wheel to which the modified limit value is applied may include a rear wheel regenerative braking force command to which a modified upper limit is applied and a front wheel regenerative braking force command to which a modified lower limit is applied.

In more detail, when the rear wheel regenerative braking force command and the front wheel regenerative braking force command to which the upper and lower limits are applied are determined, a difference between the rear wheel regenerative braking force command distributed from the required regenerative braking force command before application of the filter and the rear wheel regenerative braking force command to which the limit value is applied is determined as the rear wheel correction amount. Here, the rear wheel regenerative braking force command to which the limit value is applied may be the rear wheel regenerative braking force command to which the upper limit is applied.

That is, when the upper limit is applied to the rear wheel regenerative braking force command after subtraction to determine the rear wheel regenerative braking force command to which the upper limit is applied, a difference between the distributed rear wheel regenerative braking force command and the rear wheel regenerative braking force command to which the upper limit is applied is determined and determined as the rear wheel correction amount.

Similarly, a difference between the front wheel regenerative braking force command distributed from the required regenerative braking force command before application of the filter and the front wheel regenerative braking force command to which the limit value is applied is determined as the front wheel correction amount. Here, the front wheel regenerative braking force command to which the limit value is applied may be the front wheel regenerative braking force command to which the lower limit is applied.

That is, when the lower limit is applied to the front wheel regenerative braking force command after addition to determine the front wheel regenerative braking force command to which the lower limit is applied, a difference between the distributed front wheel regenerative braking force command and the front wheel regenerative braking force command to which the lower limit is applied is determined and determined as the front wheel correction amount.

Accordingly, when the rear wheel correction amount and the front wheel correction amount are determined as described above, the absolute value of the determined rear wheel correction amount and the absolute value of the front wheel correction amount are compared with each other, and a wheel including a small absolute value of the correction amount and a wheel including a large absolute value of the correction amount are determined.

Subsequently, the correction amount on a wheel side including a small absolute value of the correction amount (that is, the correction amount including a relatively small absolute value) is determined and set as an upper limit of the correction amount on a wheel side including a large absolute value of the correction amount. Furthermore, a value obtained by multiplying the correction amount on the wheel side including the small absolute value of the correction amount (that is, the correction amount including the relatively small absolute value) by −1 is determined and set as a lower limit of the correction amount on the wheel side including the large absolute value of the correction amount.

Subsequently, the correction amount on the wheel side including the large absolute value of the correction amount is limited to the upper limit of the correction amount and the lower limit of the correction amount to modify the correction amount, the present modified correction amount is added to the distributed regenerative braking force command of the corresponding wheel, and the added value is determined as the regenerative braking force command of the corresponding wheel to which the modified limit value is applied. Furthermore, the regenerative braking force command of the corresponding wheel, to which the modified limit value is applied, determined in the instant way is used to control the regenerative braking of the vehicle.

Furthermore, in the exemplary embodiment in which the filter for passing the natural frequency component is used as described above, a method of using a weight is applied in the same way as in the exemplary embodiment using the filter for removing the natural frequency component. The use of weights in an exemplary embodiment of the present disclosure is not different from that in the exemplary embodiment in which the filter for removing the natural frequency component is used, and thus a description thereof will be omitted.

Furthermore, as various exemplary embodiments of the present disclosure, the control unit may intermittently shift a removal target natural frequency or a pass target natural frequency of the filter based on vehicle weight information in real time or at predetermined intervals.

Typically, the natural frequency of the suspension pitch motion does not change unless a vehicle suspension structure or settings are changed. However, the natural frequency may be changed due to a change in vehicle weight.

For example, when a change in vehicle weight occurs by a large change amount of 10% or more of the total weight of the vehicle, the natural frequency is changed, and thus a filter modeled based on information of a pre-constructed transfer function may not be effective. Therefore, it is desirable to shift a value of the natural frequency removed and passed through the filter according to the change in vehicle weight.

In an exemplary embodiment of the present disclosure, vehicle weight information may be estimated based on real-time information collected through a sensor in the vehicle by the control unit. For example, to obtain vehicle weight information, it is possible to use a vehicle weight estimation method included in Korean Patent Application Laid-Open No. 10-2021-0068873 (Jun. 10, 2021) filed by the present inventor.

According to Patent Publication No. 10-2021-0068873 (US Patent Application Publication No. 2021/0163018), noise is removed by filtering an acceleration signal input from an acceleration sensor in a vehicle at a moment of stopping, a cycle value of the acceleration signal is determined from the noise-free acceleration signal, and then a vehicle weight may be estimated in real time using information of the determined cycle value.

Hereinafter, a more detailed description will be provided of a configuration of a filter configured for removing a specific frequency component (natural frequency component) of the pre-constructed transfer function.

As described above, the transfer function is constructed to determine the state information related to the suspension pitch motion of the vehicle by taking a variable representing the vehicle driving state as input. Here, the state information related to the suspension pitch motion of the vehicle may be a pitch angle or vertical load.

In an exemplary embodiment of the present disclosure, as a specific frequency component of the transfer function, a frequency component to be removed through the filter may be a natural frequency component of the vehicle suspension pitch motion, and a regenerative braking force command including a frequency component corresponding to the natural frequency of the vehicle suspension pitch motion excites the vehicle suspension pitch motion.

Therefore, the frequency to be removed through the filter may be determined as the natural frequency of the vehicle suspension pitch motion and be used to configure the filter. In the present instance, the natural frequency of the vehicle suspension pitch motion may be determined as the natural frequency of a transfer function taking the pitch angle or vertical load, which is state information related to the suspension pitch motion, as output as described above.

In an exemplary embodiment of the present disclosure, when the vehicle suspension pitch motion vibration is analyzed in the frequency domain (for example, analyzed in a Bode plot), a primary frequency, at which the peak gain occurs, may be defined as the natural frequency.

A regenerative braking force command including a frequency component corresponding to the above-mentioned natural frequency excites the vehicle suspension pitch motion, and as a result, longitudinal load movement severely occurs. Thus, a possibility that slip will occur increases in one of the front wheel and the rear wheel having traction decreased due to the longitudinal load movement. Therefore, it is desirable to remove the natural frequency component from the regenerative braking force command to reduce the wheel slip of the vehicle and decrease the suspension pitch motion.

Accordingly, in an exemplary embodiment of the present disclosure, information related to a transfer function that takes the state information related to the suspension pitch motion of the vehicle as output is used. A filter configured for removing the natural frequency component of the transfer function using the natural frequency information of the transfer function indicating the natural frequency of the vehicle suspension pitch motion is configured in the control unit (first control unit 20). The control unit utilizes the filter to correct the regenerative braking force command.

At the present time, the filter may be a low-pass filter including a cut-off frequency corresponding to the natural frequency of the transfer function of the suspension pitch motion, a notch filter (a band stop filter or a band cancellation filter) including a center frequency corresponding to the natural frequency, etc.

In an exemplary embodiment of the present disclosure, because the filter is used to remove, from the regenerative braking force command, a component corresponding to the natural frequency of the transfer function of the pre-constructed suspension pitch motion as described above, the cut-off frequency of the low-pass filter or the center frequency of the notch filter may not match a natural frequency to be removed.

However, considering an error range of a set natural frequency value, the natural frequency to be removed needs to be higher than the cut-off frequency of the low-pass filter, and the natural frequency to be removed needs to fall within a stop band of the notch filter.

In addition to the low-pass filter or the notch filter, a multi-dimensional filter may be used to remove the component corresponding to the natural frequency. Furthermore, the filter may be designed using the transfer function itself constructed by modeling the real-time vertical load caused by the above-described suspension pitch motion or longitudinal load movement of the vehicle.

For example, it is assumed that a transfer function TF for deriving a pitch angle (squat angle, $\varphi$) from an actual regenerative braking force command (torque command, Tq) is constructed as in the following Equation 1.

$$TF = \frac{\phi}{Tq} = \frac{1}{c_1 s^2 + c_2 s + c_3} \quad \text{[Equation 1]}$$

In the instant case, a filter based on the transfer function TF may be designed and configured as illustrated in Equation 2 below, and may be applied to the regenerative braking force command by the control unit and used to control the regenerative braking of the vehicle.

$$1 - c_4 sTF - c_5 TF = 1 - \frac{c_4 s}{c_1 s^2 + c_2 s + c_3} - \frac{c_5}{c_1 s^2 + c_2 s + c_3} \quad \text{[Equation 2]}$$
$$= \frac{1}{c_1 s^2 + c_2 s + c_3}(c_1 s^2 + c_2 s + c_3 - c_4 s - c_5)$$

-continued $$= \frac{c_1 s^2 + (c_2 - c_4)s + (c_3 - c_5)}{c_1 s^2 + c_2 s + c_3}$$

Here, $c_1$, $c_2$, $c_3$, $c_4$, $c_5$, etc. are coefficients which may be set (positive or negative), and s is a Laplace operator.

Previously, it has been described that the natural frequency to be removed or the natural frequency to be passed, which is applied to the filter, may be shifted according to the change in vehicle weight. A value of the natural frequency may be shifted by changing the filter configuration, for example, by changing values of the Laplace operators $c_1$, $c_2$, $c_3$, $c_4$, and $c_5$ in the filter according to a shifted value.

Next, a more detailed description will be given of the configuration of the filter configured for passing the specific frequency component (natural frequency component) of the pre-constructed transfer function.

In an exemplary embodiment of the present disclosure, as the specific frequency component of the transfer function, the frequency component passing through the filter may be the natural frequency component of the vehicle suspension pitch motion. As described above, the regenerative braking force command including the frequency component corresponding to the natural frequency of the vehicle suspension pitch motion excites the vehicle suspension pitch motion.

As a result, the longitudinal load movement of the vehicle severely occurs, and a possibility that slip will occur increases in one of the front wheel and the rear wheel of the vehicle having traction decreased due to the longitudinal load movement.

However, on the other hand, an environment in which slipping hardly occurs is generated in one of the front wheel and the rear wheel of the vehicle having traction increased due to the longitudinal load movement. Therefore, to ensure excellent vehicle braking performance, it is preferable to enhance the component corresponding to the natural frequency of the suspension pitch motion in the regenerative braking force command so that load movement may be used.

In the present way, to enhance the component corresponding to the natural frequency of the suspension pitch motion in the regenerative braking force command, a filter configured for passing the component corresponding to the natural frequency may be configured and used.

At the present time, the filter may be a high-pass filter including a cut-off frequency corresponding to the natural frequency of the transfer function of the suspension pitch motion, a band-pass filter including a center frequency corresponding to the natural frequency, etc.

In an exemplary embodiment of the present disclosure, because the filter is used to enhance, in the regenerative braking force command, a component corresponding to the natural frequency of the transfer function of the pre-constructed suspension pitch motion, that is, the natural frequency of the transfer function outputting the state information related to the suspension pitch motion of the vehicle, as described above, the cut-off frequency of the high-pass filter or the center frequency of the band-pass filter may not match a natural frequency to be passed.

However, the natural frequency to be passed needs to be higher than the cut-off frequency of the high-pass filter, and the natural frequency to be passed needs to fall within the pass band of the band-pass filter.

In addition to the high-pass filter or the band-pass filter, a multi-dimensional filter may be used to enhance the component corresponding to the natural frequency. Furthermore, the filter may be designed using the transfer function itself constructed by modeling the real-time vertical load caused by the above-described suspension pitch motion or longitudinal load movement of the vehicle.

For example, it is assumed that a transfer function TF for deriving a pitch angle (squat angle, φ) from an actual regenerative braking force command (torque command, Tq) is constructed as in the following Equation 3.

$$TF = \frac{\phi}{Tq} = \frac{1}{c_1 s^2 + c_2 s + c_3} \quad \text{[Equation 3]}$$

In the instant case, a filter based on the transfer function TF may be designed and configured as illustrated in Equation 4 below, and may be applied to the regenerative braking force command by the control unit and used to control the regenerative braking of the vehicle.

$$c_4 s TF + c_5 TF = \frac{c_4 s}{c_1 s^2 + c_2 s + c_3} + \frac{c_5}{c_1 s^2 + c_2 s + c_3} \quad \text{[Equation 4]}$$

$$= \frac{c_4 s + c_5}{c_1 s^2 + c_2 s + c_3}$$

Here, $c_1$, $c_2$, $c_3$, $c_4$, $c_5$, etc. are coefficients which may be set (positive or negative), and s is a Laplace operator.

Previously, it has been described that a value of the natural frequency used in the filter may be shifted according to the change in vehicle weight. A value of the natural frequency may be shifted by changing values of the Laplace operators $c_1$, $c_2$, $c_3$, $c_4$, and $c_5$ according to a shifted value.

Figure 7:
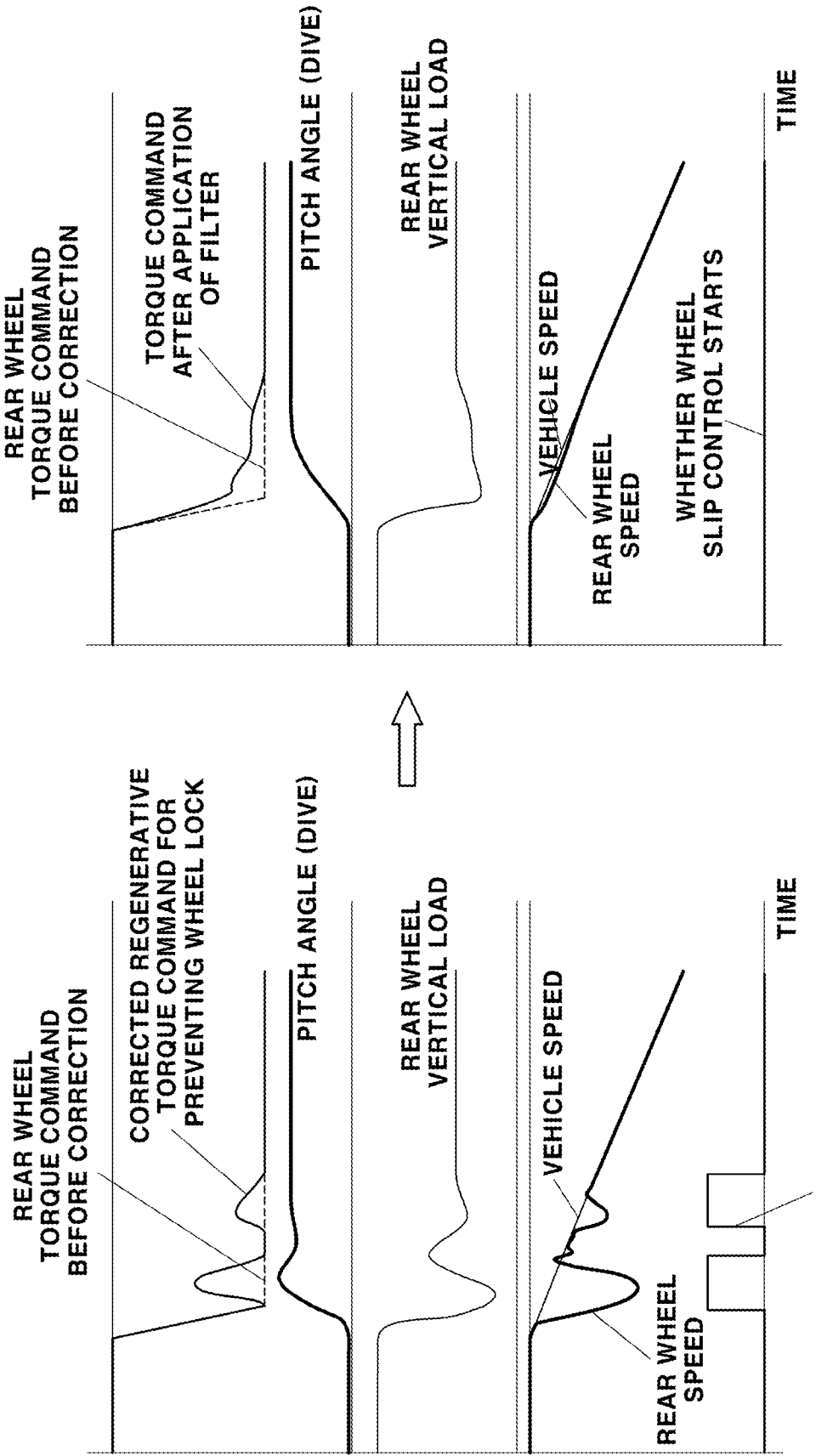
FIG. 7 and FIG. 8 are diagrams for comparing a conventional wheel slip control state with a regenerative braking control state of the present disclosure.
Figure 8:
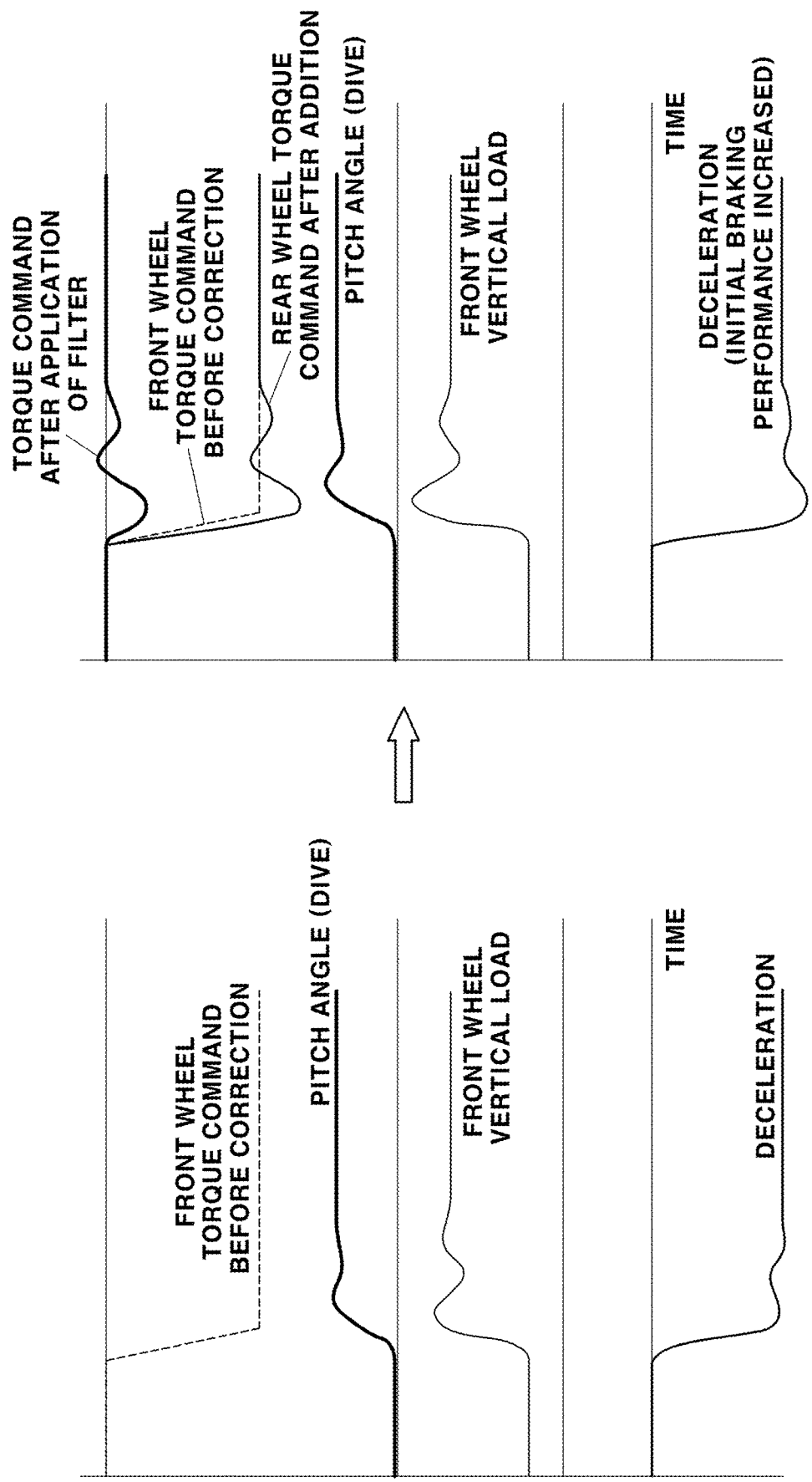

FIG. 7 and FIG. 8 are diagrams for comparing a conventional wheel slip control state with a regenerative braking control state of the present disclosure, and illustrate a regenerative braking control state for the rear wheel and a regenerative braking control state for the front wheel, respectively.

In FIG. 7, "the present disclosure" indicates a regenerative braking control state of the exemplary embodiment to which the natural frequency removal filter is applied, and in FIG. 8 "the present disclosure" indicates a regenerative braking control state of the exemplary embodiment to which the natural frequency pass filter is applied.

In FIG. 7, "rear wheel command torque before correction" indicates a rear wheel torque (rear wheel regenerative braking torque or rear wheel regenerative braking force) command distributed from a required torque (required regenerative braking torque or required regenerative braking force) command according to the power distribution ratio. FIG. 7 illustrates, as real-time change information, pitch angle information during vehicle dive (or nose-down), vertical load of the rear wheel, driving wheel (rear wheel) speed, vehicle speed, rear wheel torque (rear wheel regenerative braking torque) command before correction, and torque (regenerative braking torque) command after application of the filter, and indicates whether or not to start wheel slip control, etc.

According to a conventional control method, application of the regenerative braking torque command causes the vehicle to dive (nose-down), reducing the vertical load on the rear wheel. However, the vertical load is not simply reduced, and may be reduced while repeatedly descending and ascending due to mechanical characteristics of the vehicle.

Accordingly, slip occurs so that the wheel speed momentarily increases in the driving wheel (front wheel). When slip occurs, the wheel speed converges while wheel slip control is performed, and occurrence of slip, performance of wheel slip control, and wheel speed convergence may be repeated again. As described above, according to the related art, a situation in which wheel slip control needs to be performed several times may occur.

On the other hand, when the regenerative braking control method according to an exemplary embodiment of the present disclosure is applied, occurrence of wheel slip may be prevented in advance by use of the regenerative braking torque command after the filter is applied. Accordingly, wheel slip control may not be performed.

FIG. 8 illustrates pitch angle information during vehicle dive, rear wheel vertical load, deceleration, front wheel torque command before correction, rear wheel torque command after addition, and a torque command after application of filter, and indicates whether wheel slip control starts.

As may be seen from FIG. 8, in an exemplary embodiment of the present disclosure, because a filter that enhances the natural frequency component in the regenerative braking torque command is used, the vertical load on the front wheel increases, and the initial deceleration on the front wheel increases at the same time, so that initial braking performance of the vehicle may be increased.

Figure 9:
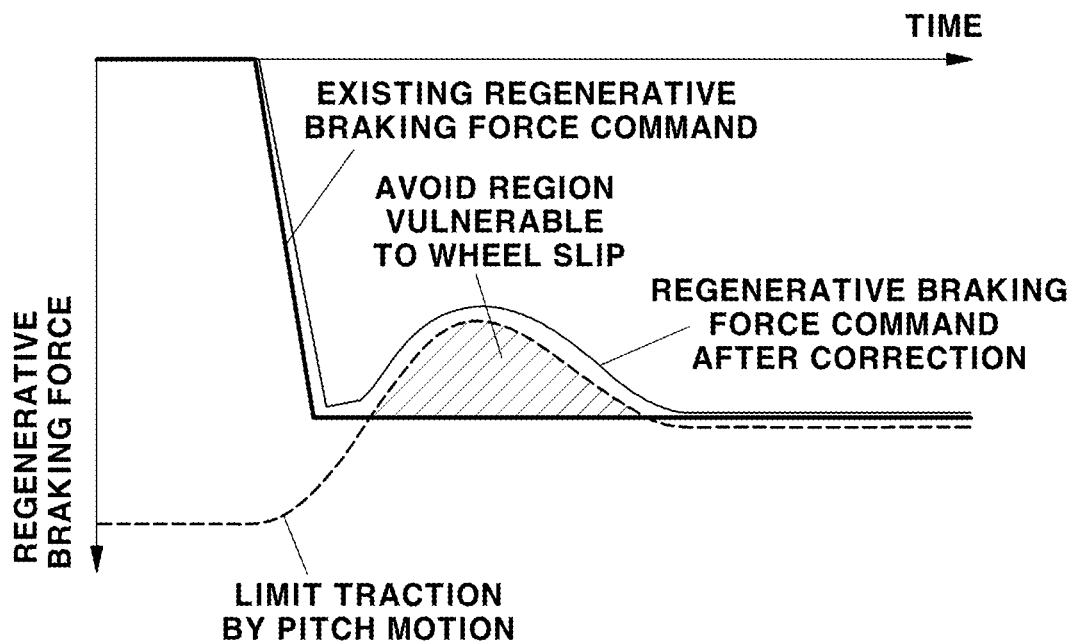
FIG. 9, FIG. 10 and FIG. 11 are diagrams for describing an effect of regenerative braking control according to an exemplary embodiment of the present disclosure.
Figure 10:
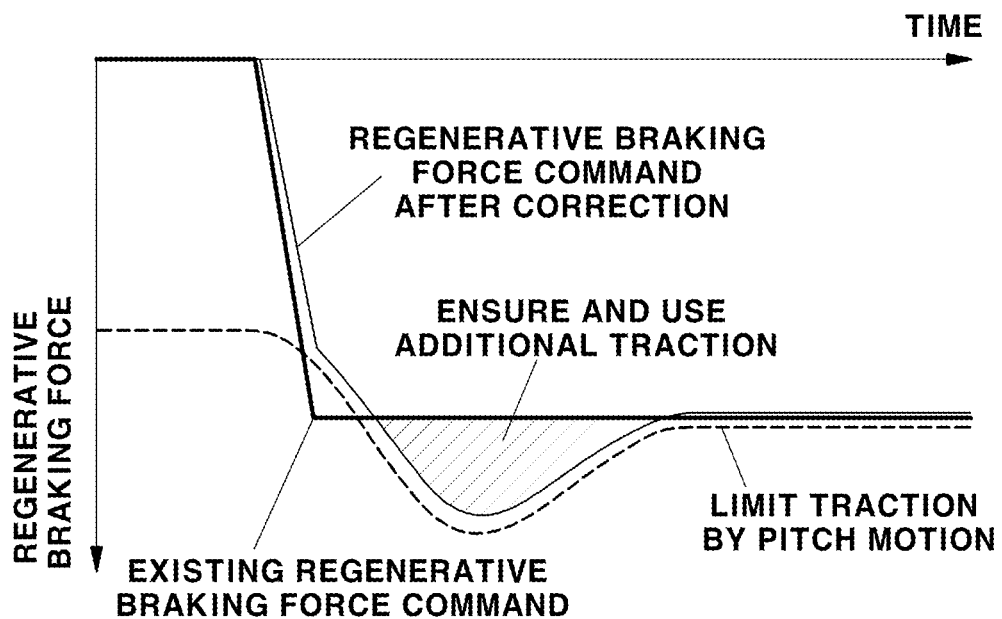
Figure 11:
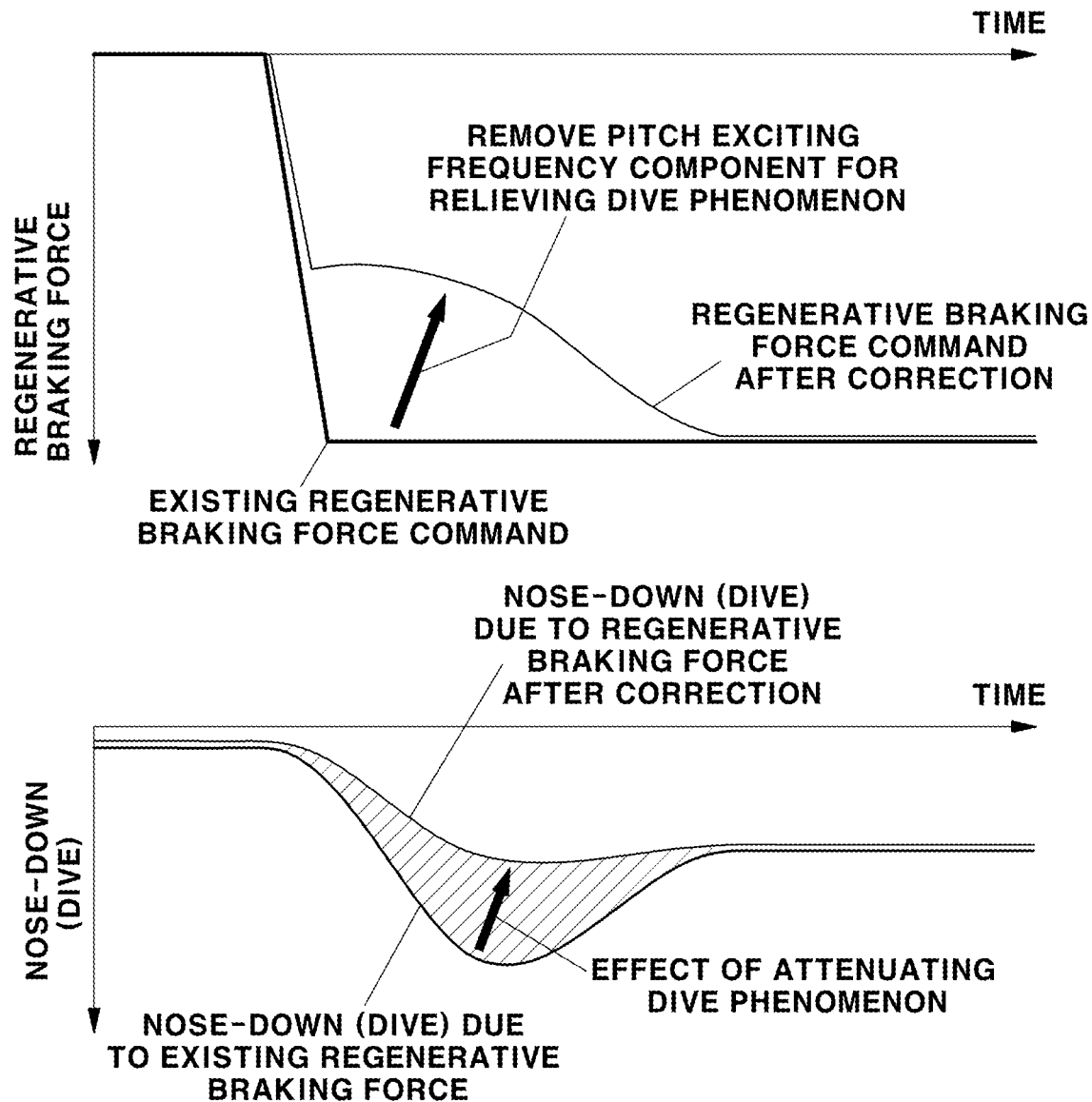

Next, FIG. 9, FIG. 10 and FIG. 11 are diagrams for describing an effect of regenerative braking control according to an exemplary embodiment of the present disclosure, FIG. 9 illustrates an effect of an exemplary embodiment in which the filter for removing the natural frequency component is applied, and FIG. 10 illustrates an effect of an exemplary embodiment in which the filter for passing (enhancing) the natural frequency component is applied.

First, as illustrated in FIG. 9, when regenerative braking force command correction using a filter that removes or reduces the corresponding natural frequency component from the regenerative braking force command and regenerative braking control according to the regenerative braking force command after correction are performed in consideration of the natural frequency characteristics of the vehicle suspension pitch motion (pitch motion), it is possible to perform regenerative braking control configured for preventing or minimizing occurrence of wheel slip before occurrence of wheel slip and not after occurrence of wheel slip. Furthermore, it is possible to perform regenerative braking control configured for avoiding a region vulnerable to wheel slip when compared to regenerative braking control according to the existing regenerative braking force command.

Furthermore, as illustrated in FIG. 10, when regenerative braking force command correction using a filter that enhances the corresponding natural frequency component in the regenerative braking force command and regenerative braking control according to the regenerative braking force command after correction are performed in consideration of the natural frequency characteristics of the vehicle suspension pitch motion (pitch motion), it is possible to improve braking performance within a limit where wheel slip does not occur in consideration of real-time vertical load. That is, because it is possible to ensure and use additional traction compared to regenerative braking control according to the existing regenerative braking force command, acceleration performance may be increased.

Next, as illustrated in FIG. 11, when regenerative braking force command correction using a filter that removes or reduces the corresponding natural frequency component from the regenerative braking force command and regenerative braking control according to the regenerative braking force command after correction are performed in consideration of the natural frequency characteristics of the vehicle suspension pitch motion, it is possible to attenuate excessive suspension pitch motion of the vehicle. That is, it is possible to obtain an effect of attenuating the nose-up phenomenon when compared to the regenerative braking control according to the existing regenerative braking force command.

As a result, according to the regenerative braking control method of the present disclosure, it is possible to effectively prevent wheel slip only by applying a software method without a change in vehicle hardware or a cost increase factor, and it is possible to achieve increased tire durability through wheel slip prevention. Furthermore, it is possible to obtain effects of improving the vehicle braking performance through maximum use of suspension pitch motion limit traction, and improving ride comfort due to the suspension pitch motion attenuation.

Accordingly, according to the method for controlling the regenerative braking force of the vehicle according to an exemplary embodiment of the present disclosure, it is possible to effectively prevent wheel slip only by applying a software method without a change in vehicle hardware or a cost increase factor, and it is possible to achieve increased tire durability through wheel slip prevention. Furthermore, it is possible to obtain effects of improving the vehicle braking performance through maximum use of suspension pitch motion limit traction, and improving ride comfort due to the suspension pitch motion attenuation.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method for controlling regenerative braking of a vehicle, the method comprising:
   determining a natural frequency of vehicle suspension pitch motion according to characteristics of a suspension device of the vehicle;
   providing a filter configured for removing or passing a natural frequency component of the vehicle suspension pitch motion to a control unit of the vehicle;
   determining, by the control unit, a required regenerative braking force command based on vehicle driving information collected during driving of the vehicle;
   determining, by the control unit, a final front wheel regenerative braking force command and a final rear wheel regenerative braking force command through a filtering process using the filter from the determined required regenerative braking force command; and
   controlling, by the control unit, a regenerative braking force applied to a front wheel and a rear wheel of the vehicle by a driving device for driving the vehicle according to the determined final front wheel regenerative braking force command and the determined final rear wheel regenerative braking force command,
   wherein the determining of the final front wheel regenerative braking force command and the final rear wheel regenerative braking force command includes:
   determining weights $\alpha$ and $1-\alpha$ corresponding to a current vehicle driving state using a state variable map from the vehicle driving information;
   distributing the required regenerative braking force command according to a power distribution ratio to determine a front wheel regenerative braking force command and a rear wheel regenerative braking force command;
   adding values obtained by applying the determined weights $\alpha$ and $1-\alpha$ to the front wheel regenerative braking force command determined without the distribution and filtering process and the front wheel regenerative braking force command obtained through the filtering process after the distribution;
   adding values obtained by applying the determined weights $\alpha$ and $1-\alpha$ to the rear wheel regenerative braking force command determined without the distribution and filtering process and the rear wheel regenerative braking force command obtained through the filtering process after the distribution; and
   determining the front wheel regenerative braking force command and the rear wheel regenerative braking force command obtained by addition after application of the weights as the final front wheel regenerative braking force command and the final rear wheel regenerative braking force command.

2. The method of claim 1, wherein, in the filtering process, the filter is applied to the required regenerative braking force command, the front wheel regenerative braking force command distributed from the required regenerative braking force command, or the rear wheel regenerative braking force command distributed from the required regenerative braking force command to remove or pass the natural frequency component of the vehicle suspension pitch motion from or in the required regenerative braking force command, the front wheel regenerative braking force command, or the rear wheel regenerative braking force command.

3. The method of claim 1, wherein the filter is one selected from:
   a low-pass filter including a cut-off frequency corresponding to the natural frequency of the vehicle suspension pitch motion, and a notch filter including a center frequency corresponding to the natural frequency of the vehicle suspension pitch motion, which are filters configured for removing the natural frequency component; or
   a high-pass filter including a cut-off frequency corresponding to the natural frequency of the vehicle suspension pitch motion, and a band-pass filter including the center frequency corresponding to the natural frequency of the vehicle suspension pitch motion, which are filters configured for passing the natural frequency.

4. The method of claim 1,
   wherein the filter is configured for removing the natural frequency component of the vehicle suspension pitch motion; and
   wherein the determining of the final front wheel regenerative braking force command and the final rear wheel regenerative braking force command includes:
   distributing the required regenerative braking force command to the front wheel regenerative braking force command and the rear wheel regenerative braking force command;

applying the filter to the distributed rear wheel regenerative braking force command to determine the rear wheel regenerative braking force command after application of the filter as the final rear wheel regenerative braking force command;

determining a difference between the distributed rear wheel regenerative braking force command and the rear wheel regenerative braking force command after application of the filter; and performing correction for compensating the distributed front wheel regenerative braking force command by the determined difference in command to determine a corrected front wheel regenerative braking force command as the final front wheel regenerative braking force command.

5. The method of claim 1, wherein the filter is configured for removing the natural frequency component of the vehicle suspension pitch motion; and wherein the determining of the final front wheel regenerative braking force command and the final rear wheel regenerative braking force command includes:

applying the filter to the required regenerative braking force command to determine the required regenerative braking force command after application of the filter;

distributing the required regenerative braking force command after application of the filter to the front wheel regenerative braking force command and the rear wheel regenerative braking force command to determine the distributed rear wheel regenerative braking force command as the final rear wheel regenerative braking force command;

determining a difference between the required regenerative braking force command before application of the filter and the required regenerative braking force command after application of the filter; and performing correction for compensating the distributed front wheel regenerative braking force command by the determined difference in command to determine a corrected front wheel regenerative braking force command as the final front wheel regenerative braking force command.

6. The method of claim 1, wherein the filter is configured for removing the natural frequency component of the vehicle suspension pitch motion; and wherein the determining of the final front wheel regenerative braking force command and the final rear wheel regenerative braking force command includes:

distributing the required regenerative braking force command to the front wheel regenerative braking force command and the rear wheel regenerative braking force command;

applying the filter to the required regenerative braking force command and determining the required regenerative braking force command after application of the filter;

determining a difference between the required regenerative braking force command before application of the filter and the required regenerative braking force command after application of the filter; and performing correction for compensating each of the distributed front wheel regenerative braking force command and the distributed rear wheel regenerative braking force command by the determined difference in command to determine the final front wheel regenerative braking force command and the final rear wheel regenerative braking force command from a corrected front wheel regenerative braking force command and a corrected rear wheel regenerative braking force command, respectively.

7. The method of claim 1, wherein the filter is configured for passing the natural frequency component of the vehicle suspension pitch motion; and wherein the determining of the final front wheel regenerative braking force command and the final rear wheel regenerative braking force command includes:

distributing the required regenerative braking force command to the front wheel regenerative braking force command and the rear wheel regenerative braking force command to determine the distributed rear wheel regenerative braking force command as the final rear wheel regenerative braking force command;

applying the filter to the distributed front wheel regenerative braking force command to determine the front wheel regenerative braking force command after application of the filter; and adding the front wheel regenerative braking force command after application of the filter to the distributed front wheel regenerative braking force command distributed from the required regenerative braking force command to determine the front wheel regenerative braking force command after addition as the final front wheel regenerative braking force command.

8. The method of claim 1, wherein the filter is configured for passing the natural frequency component of the vehicle suspension pitch motion; and wherein the determining of the final front wheel regenerative braking force command and the final rear wheel regenerative braking force command includes:

distributing the required regenerative braking force command to the front wheel regenerative braking force command and the rear wheel regenerative braking force command;

applying the filter to the distributed front wheel regenerative braking force command to determine the front wheel regenerative braking force command after application of the filter as the final front wheel regenerative braking force command; and subtracting the front wheel regenerative braking force command after application of the filter from the distributed rear wheel regenerative braking force command distributed from the required regenerative braking force command to determine the rear wheel regenerative braking force command after subtraction as the final rear wheel regenerative braking force command.

9. The method of claim 1, wherein the filter is configured for passing the natural frequency component of the vehicle suspension pitch motion; and wherein the determining of the final front wheel regenerative braking force command and the final rear wheel regenerative braking force command includes:

distributing the required regenerative braking force command to the front wheel regenerative braking force command and the rear wheel regenerative braking force command;

applying the filter to a distributed rear wheel regenerative braking force command to determine the rear wheel regenerative braking force command after application of the filter as the final rear wheel regenerative braking force command; and adding the rear wheel regenerative braking force command after application of the filter to the distributed front wheel regenerative braking force command distributed from the required regenerative braking force command to determine the front wheel regenerative braking force command after addition as the final front wheel regenerative braking force command.

10. The method of claim 1,
wherein the filter is configured for passing the natural frequency component of the vehicle suspension pitch motion; and
wherein the determining of the final front wheel regenerative braking force command and the final rear wheel regenerative braking force command includes:
distributing the required regenerative braking force command to the front wheel regenerative braking force command and the rear wheel regenerative braking force command to determine the distributed front wheel regenerative braking force command as the final front wheel regenerative braking force command;
applying the filter to a distributed rear wheel regenerative braking force command to determine the rear wheel regenerative braking force command after application of the filter; and
subtracting the rear wheel regenerative braking force command after application of the filter from the distributed rear wheel regenerative braking force command distributed from the required regenerative braking force command to determine the rear wheel regenerative braking force command after subtraction as the final rear wheel regenerative braking force command.

11. The method of claim 1,
wherein the filter is configured for passing the natural frequency component of the vehicle suspension pitch motion; and
wherein the determining of the final front wheel regenerative braking force command and the final rear wheel regenerative braking force command includes:
distributing the required regenerative braking force command to the front wheel regenerative braking force command and the rear wheel regenerative braking force command;
applying the filter to the required regenerative braking force command to determine the required regenerative braking force command after application of the filter; and
performing correction for compensating each of the distributed front wheel regenerative braking force command and the distributed rear wheel regenerative braking force command by the required regenerative braking force command after application of the filter to determine a corrected front wheel regenerative braking force command and a corrected rear wheel regenerative braking force command as the final front wheel regenerative braking force command and the final rear wheel regenerative braking force command, respectively.

12. The method of claim 1,
wherein the filter is configured for passing the natural frequency component of the vehicle suspension pitch motion; and wherein the determining of the final front wheel regenerative braking force command and the final rear wheel regenerative braking force command includes:
distributing the required regenerative braking force command to the front wheel regenerative braking force command and the rear wheel regenerative braking force command;
applying the filter to the required regenerative braking force command to determine the required regenerative braking force command after application of the filter;
distributing the required regenerative braking force command after application of the filter as a front wheel distribution component and a rear wheel distribution component;
adding the front wheel distribution component to the distributed front wheel regenerative braking force command to determine the front wheel regenerative braking force command after addition as the final front wheel regenerative braking force command; and
subtracting the rear wheel distribution component from the distributed rear wheel regenerative braking force command to determine the rear wheel regenerative braking force command after subtraction as the final rear wheel regenerative braking force command.

13. The method of claim 1, further including:
estimating, by the control unit, a vehicle weight based on information collected through an in-vehicle sensor; and
changing, by the control unit, the filter so that a natural frequency allowed to be removed or passed by the filter is shifted according to a change amount of the estimated vehicle weight.

14. The method of claim 1,
wherein the determining of the final front wheel regenerative braking force command and the final rear wheel regenerative braking force command includes determining, by the control unit, whether to apply the filter based on the vehicle driving information, and
wherein upon determining not to apply the filter from the vehicle driving information, the front wheel regenerative braking force command and the rear wheel regenerative braking force command obtained by distributing the required regenerative braking force command according to a power distribution ratio are determined as the final front wheel regenerative braking force command and the final rear wheel regenerative braking force command without the filtering process.

15. The method of claim 1, wherein the control unit is configured to:
determine a weight corresponding to a current vehicle driving state using a state variable map from the vehicle driving information; and
adjust gain of the filter according to the determined weight.

16. The method of claim 1, further including:
constructing a transfer function modeled to determine and output state information related to the vehicle suspension pitch motion by taking a variable representing a vehicle driving state as input thereof,
wherein the natural frequency of the vehicle suspension pitch motion is determined as a natural frequency of the constructed transfer function.

* * * * *